United States Patent
Geisner et al.

(10) Patent No.: US 9,268,406 B2
(45) Date of Patent: Feb. 23, 2016

(54) VIRTUAL SPECTATOR EXPERIENCE WITH A PERSONAL AUDIO/VISUAL APPARATUS

(75) Inventors: Kevin A. Geisner, Mercer Island, WA (US); Kathryn Stone Perez, Kirkland, WA (US); Stephen G. Latta, Seattle, WA (US); Ben J. Sugden, Woodinville, WA (US); Benjamin I. Vaught, Seattle, WA (US); Alex Aben-Athar Kipman, Redmond, WA (US); Michael J. Scavezze, Bellevue, WA (US); Daniel J. McCulloch, Kirkland, WA (US); Darren Bennett, Seattle, WA (US); Jason Scott, Kirkland, WA (US); Ryan L. Hastings, Seattle, WA (US); Brian E. Keane, Bellevue, WA (US); Christopher E. Miles, Seattle, WA (US); Robert L. Crocco, Jr., Seattle, WA (US); Mathew J. Lamb, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 405 days.

(21) Appl. No.: 13/538,923

(22) Filed: Jun. 29, 2012

(65) Prior Publication Data
US 2013/0083173 A1    Apr. 4, 2013

Related U.S. Application Data

(63) Continuation-in-part of application No. 13/250,878, filed on Sep. 30, 2011.

(51) Int. Cl.
*G09G 5/377* (2006.01)
*G06F 3/01* (2006.01)
(Continued)

(52) U.S. Cl.
CPC ............. *G06F 3/017* (2013.01); *G02B 27/017* (2013.01); *G06F 3/013* (2013.01); *G06T 19/006* (2013.01);
(Continued)

(58) Field of Classification Search
CPC ................................ G06F 3/048; G06F 3/0482
USPC ............................................................ 345/633
See application file for complete search history.

(56) References Cited

U.S. PATENT DOCUMENTS 5,333,874 A    8/1994    Arnold et al.
5,401,026 A    3/1995    Eccher et al.
(Continued)

FOREIGN PATENT DOCUMENTS

| | | |
|---|---|---|
| CN | 101470102 A | 7/2009 |
| CN | 101515198 A | 8/2009 |
| EP | 1435737 A1 | 7/2004 |

OTHER PUBLICATIONS

"Agents That Talk and Hit Back: Animated Agents in Augmented Reality" István Barakonyi, Thomas Psik, Dieter Schmalstieg, Proceedings of the Third IEEE, 2004.*

(Continued)

*Primary Examiner* — Javid A Amini
(74) *Attorney, Agent, or Firm* — Dan Choi; Judy Yee; Micky Minhas

(57) ABSTRACT

Technology is described for providing a virtual spectator experience for a user of a personal A/V apparatus including a near-eye, augmented reality (AR) display. A position volume of an event object participating in an event in a first 3D coordinate system for a first location is received and mapped to a second position volume in a second 3D coordinate system at a second location remote from where the event is occurring. A display field of view of the near-eye AR display at the second location is determined, and real-time 3D virtual data representing the one or more event objects which are positioned within the display field of view are displayed in the near-eye AR display. A user may select a viewing position from which to view the event. Additionally, virtual data of a second user may be displayed at a position relative to a first user.

20 Claims, 15 Drawing Sheets

(51) Int. Cl.

| | | |
|---|---|---|
| *H04N 13/02* | (2006.01) | |
| *H04N 13/04* | (2006.01) | |
| *G02B 27/01* | (2006.01) | |
| *G06T 19/00* | (2011.01) | |
| *H04N 13/00* | (2006.01) | |
| *H04N 7/18* | (2006.01) | |
| *H04N 21/214* | (2011.01) | |
| *H04N 21/2187* | (2011.01) | |
| *H04N 21/234* | (2011.01) | |
| *H04N 21/414* | (2011.01) | |
| *H04N 21/81* | (2011.01) | |

(52) U.S. Cl.
CPC ......... *H04N 13/0239* (2013.01); *H04N 13/044* (2013.01); *H04N 13/0468* (2013.01); *G02B 2027/014* (2013.01); *G02B 2027/0178* (2013.01); *H04N 7/181* (2013.01); *H04N 13/0059* (2013.01); *H04N 21/2143* (2013.01); *H04N 21/2187* (2013.01); *H04N 21/23418* (2013.01); *H04N 21/41407* (2013.01); *H04N 21/816* (2013.01); *H04N 21/8146* (2013.01)

(56) References Cited

U.S. PATENT DOCUMENTS

| | | | |
|---|---|---|---|
| 5,728,006 A | | 3/1998 | Teitell et al. |
| 5,762,561 A | | 6/1998 | Zine |
| 5,826,578 A | | 10/1998 | Curchod |
| 5,826,874 A | | 10/1998 | Teitell et al. |
| 6,120,461 A | * | 9/2000 | Smyth ........................... 600/558 |
| 6,217,444 B1 | | 4/2001 | Kataoka et al. |
| 6,224,387 B1 | | 5/2001 | Jones |
| 6,517,353 B1 | | 2/2003 | Jones |
| 6,567,536 B2 | | 5/2003 | McNitt et al. |
| 6,623,370 B1 | | 9/2003 | Willer |
| 6,663,498 B2 | | 12/2003 | Stipan |
| 6,767,282 B2 | | 7/2004 | Matsuyama et al. |
| 7,401,920 B1 | * | 7/2008 | Kranz et al. ................... 351/210 |
| 7,458,894 B2 | | 12/2008 | Danieli et al. |
| 7,671,916 B2 | | 3/2010 | Hashimoto |
| 7,693,702 B1 | | 4/2010 | Kerner et al. |
| 7,744,482 B1 | | 6/2010 | Watson |
| 7,815,516 B1 | | 10/2010 | Mortimer et al. |
| 7,817,104 B2 | | 10/2010 | Ryu et al. |
| 7,922,586 B2 | | 4/2011 | Heckendorf, III et al. |
| 8,217,856 B1 | | 7/2012 | Petrou |
| 8,235,529 B1 | | 8/2012 | Raffle et al. |
| 8,432,489 B2 | | 4/2013 | Arseneau et al. |
| 8,467,133 B2 | | 6/2013 | Miller |
| 8,477,425 B2 | | 7/2013 | Border et al. |
| 2005/0227791 A1 | | 10/2005 | McCreary et al. |
| 2006/0038833 A1 | | 2/2006 | Mallinson et al. |
| 2006/0230123 A1 | | 10/2006 | Simmons et al. |
| 2007/0035563 A1 | | 2/2007 | Biocca et al. |
| 2007/0088746 A1 | | 4/2007 | Baker |
| 2008/0018667 A1 | | 1/2008 | Cheng |
| 2008/0073430 A1 | | 3/2008 | Sickenius |
| 2008/0082465 A1 | | 4/2008 | Meijer et al. |
| 2008/0147325 A1 | | 6/2008 | Maassel et al. |
| 2008/0204450 A1 | | 8/2008 | Dawson et al. |
| 2008/0259096 A1 | | 10/2008 | Huston |
| 2009/0102859 A1 | | 4/2009 | Athsani |
| 2009/0144081 A1 | | 6/2009 | Harlan |
| 2009/0154293 A1 | | 6/2009 | Sengupta et al. |
| 2009/0167787 A1 | | 7/2009 | Bathiche et al. |
| 2009/0189974 A1 | | 7/2009 | Deering |
| 2009/0262946 A1 | | 10/2009 | Dunko |
| 2009/0265381 A1 | | 10/2009 | Canu et al. |
| 2010/0030578 A1 | | 2/2010 | Siddique et al. |
| 2010/0045701 A1 | | 2/2010 | Scott et al. |
| 2010/0111387 A1 | | 5/2010 | Christiansen, II et al. |
| 2010/0149073 A1 | * | 6/2010 | Chaum et al. ...................... 345/8 |
| 2010/0164990 A1 | | 7/2010 | Van Doorn |
| 2010/0171758 A1 | | 7/2010 | Maassel et al. |
| 2010/0199232 A1 | | 8/2010 | Mistry et al. |
| 2010/0208033 A1 | | 8/2010 | Edge et al. |
| 2010/0238161 A1 | * | 9/2010 | Varga et al. .................... 345/419 |
| 2010/0257252 A1 | | 10/2010 | Dougherty et al. |
| 2010/0287485 A1 | * | 11/2010 | Bertolami et al. ............. 715/764 |
| 2011/0065496 A1 | | 3/2011 | Gagner et al. |
| 2011/0098109 A1 | | 4/2011 | Leake et al. |
| 2011/0119640 A1 | | 5/2011 | Berkes et al. |
| 2011/0151955 A1 | | 6/2011 | Nave |
| 2011/0187744 A1 | | 8/2011 | Kim et al. |
| 2011/0218839 A1 | | 9/2011 | Shamaiengar |
| 2011/0221656 A1 | * | 9/2011 | Haddick et al. .................... 345/8 |
| 2011/0221793 A1 | | 9/2011 | King, III et al. |
| 2011/0237331 A1 | | 9/2011 | Doucet et al. |
| 2011/0249122 A1 | | 10/2011 | Tricoukes et al. |
| 2011/0270135 A1 | | 11/2011 | Dooley et al. |
| 2011/0301927 A1 | | 12/2011 | Ok |
| 2012/0062445 A1 | | 3/2012 | Haddick et al. |
| 2012/0166578 A1 | | 6/2012 | Hong |
| 2012/0212499 A1 | | 8/2012 | Haddick et al. |
| 2012/0236031 A1 | | 9/2012 | Haddick et al. |
| 2012/0242698 A1 | | 9/2012 | Haddick et al. |
| 2012/0299962 A1 | | 11/2012 | White et al. |
| 2013/0077049 A1 | * | 3/2013 | Bohn ............................. 351/210 |
| 2013/0139082 A1 | | 5/2013 | Wheeler et al. |
| 2013/0246967 A1 | | 9/2013 | Wheeler et al. |

OTHER PUBLICATIONS

Augemnted reality for tower: using scenarios for describing tower activities Tavanti, M. Digital Avionics Systems Conference, 2007. DASC '07. IEEE/AIAA 26th DOI: 10.1109/DASC.2007.4391928 Publication Year: 2007.*

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.

Narzt, et al., "Augmented Reality Navigation Systems", In Proceedings of Universal Access in the Information Society, vol. 4 Issue 3, Dec. 21, 2005, pp. 177-187, 11 pages.

Nilsen, et al., "Motivations for Augmented Reality Gaming", In Proceedings of FUSE, New Zealand Game Developers Conference, vol. 4, Jun. 29, 2004, 8 pages.

Vlahakis, et al., "Personalized Augmented Reality Touring of Archaeological Sites with Wearable and Mobile Computers", In Proceedings of the 6th International Symposium on Wearable Computers, Oct. 2002, 8 pages.

U.S. Appl. No. 13/250,878, filed Sep. 30, 2011.

U.S. Appl. No. 13/535,213, filed Jun. 27, 2012.

Office Action dated Sep. 4, 2013 in U.S. Appl. No. 13/631,511, 32 pages.

Response dated Feb. 4, 2014 to Office Action in U.S. Appl. No. 13/631,511, 10 pages.

Bonanni, et al., "CounterIntelligence: Augmented Reality Kitchen," In Proceedings of the Conference of Abstracts of Computer Human Interaction, Apr. 2-7, 2005, ACM Press, 7 pages.

Guo, et al., "FoodJoy: What's for dinner? FoodJoy Helps you Decide", addy lee, HCI Masters Student Georgia Tech [online], 2005 [retrieved on Dec. 14, 2011], Retrieved from the Internet: <URL:http://www.addylee.com/hci/portfolio.htm>, 1 page.

Jang, et al., "Augmented Reality Cooking System Using Tabletop Display Interface", In Proceedings of the 5th International Symposium on Ubiquitous Virtual Reality, Jul. 2007, 2 pages.

Joutou, et al., "A Food Image Recognition System With Multiple Kernel Learning," 16th IEEE International Conference on Image Processing, Nov. 2009, pp. 285-288, 4 pages.

Lee, et al., "Design and Implementation of an Augmented Reality System Using Gaze Interaction", In Proceedings of the International Conference on Information Science and Applications, Apr. 26-29, 2011, 8 pages.

Mankoff, et al., "Domisilica: Providing Ubiquitous Access to the Home", In Technical Report, GVU, College of Computing Center, Georgia Institute of Technology, 1997 [retrieved on Dec. 14, 2011], retrieved from the Internet: <URL: http://www.cc.gatech.edu/fce/domisilica/publications/uist97.html>, 8 pages.

(56) References Cited

OTHER PUBLICATIONS

Real, et al., "Augmented reality system for inventorying," 2011 6th Iberian Conference on Information Systems and Technologies (CISTI), Jun. 18, 2011, 9 pages.
Väälkkynen, et al., "Mobile Augmented Reality for Retail Environments", In Mobile HCI Workshop on Mobile Interaction in Retail Environments, Aug. 30, 2011, 4 pages.
Winlock, et al., "Toward Real-Time Grocery Detection for the Visually Impaired," IEEE Computer Society Conference on Computer Vision and Pattern Recognition Workshops, Jun. 2010, 8 pages.
International Search Report and Written Opinion of the International Searching Authority, dated Dec. 26, 2012 in International Patent Application No. PCT/US2012/058169, 8 pages.
Office Action dated Jul. 26, 2013 in U.S. Appl. No. 13/250,878, 24 pages.
"GSA Advanced Golf Simulators", [retrieved on Nov. 14, 2011], Retrieved from the Internet: <URL: http://www.golf-simulators.com/Software.htm>, 12 pages.
Conroy, "How to Create Your Own Virtual Golf Course Game", [retrieved on Nov. 14, 2011], Retrieved from the Internet: <URL:http://www.ehow.com/how_5672075_create-virtual-golf-course-game.html>, 5 pages.
Response to Office Action filed Oct. 18, 2013, in U.S. Appl. No. 13/250,878, 9 pages.
Office Action dated Feb. 4, 2014, in U.S. Appl. No. 13/250,878, 43 pages.
Response to Office Action filed May 2, 2014, in U.S. Appl. No. 13/250,878, 10 pages.
Office Action dated May 21, 2014, in U.S. Appl. No. 13/250,878, 48 pages.
Office Action dated Apr. 8, 2014, in U.S. Appl. No. 13/535,213, 55 pages.
Doswell, et al., "Extending the 'Serious Game' Boundary: Virtual Instructors in Mobile Mixed Reality Learning Games", In Digital Games Research Association International Conference, Sep. 27, 2007, pp. 524-529, 6 pages.
Response to Office Action filed Sep. 8, 2014, in U.S. Appl. No. 13/535,213, 15 pages.
Response to Office Action filed Aug. 21, 2014, in U.S. Appl. No. 13/250,878, 12 pages.
Office Action dated Apr. 17, 2015 with partial English translation, in China Patent Application No. 201210378687.3, 13 pages.
English Abstract of CN101470102A, published Jul. 1, 2009.
English Abstract of CN101515198A, published Aug. 26, 2009.
Final Office Action dated Nov. 21, 2014, in U.S. Appl. No. 13/250,878, 44 pages.
Response to Office Action dated Feb. 14, 2015, in U.S. Appl. No. 13/250,878, 11 pages.
Office Action dated Mar. 13, 2015, in U.S. Appl. No. 13/250,878, 41 pages.
Office Action dated Nov. 19, 2014, in U.S. Appl. No. 13/535,213, 26 pages.
Response to Office Action dated Feb. 18, 2015, in U.S. Appl. No. 13/535,213, 15 pages.
Final Office Action dated Apr. 30, 2015, in U.S. Appl. No. 13/535,213, 43 pages.
Herbst et al., "TimeWarp: Interactive Time Travel with a Mobile Mixed Reality Game", MobileHCI, Sep. 2-5, 2008, pp. 235-244.
Guven et al., "Interaction Techniques for Exploring Historic Sites through Situated Media", IEEE Symposium on 3D User Interfaces, Mar. 25-29, 2006, pp. 111-118.
Response to Office Action dated Jun. 15, 2015 in U.S. Appl. No. 13/250,878, 11 pages.
Response to Office Action dated Jul. 17, 2015 in U.S. Appl. No. 13/535,213, 14 pages.
Office Action dated Sep. 9, 2015 in U.S. Appl. No. 13/250,878, 50 pages.
Response to Office Action dated Jul. 28, 2015 with English Summary in Chinese Patent Application No. 201210378687.3, 17 pages.
Office Action with English Summary dated Oct. 27, 2015 in Chinese Patent Application No. 201210378687.3, 7 pages.
Notice of Allowance dated Nov. 6, 2015 in U.S. Appl. No. 13/535,213, 12 pages.

* cited by examiner

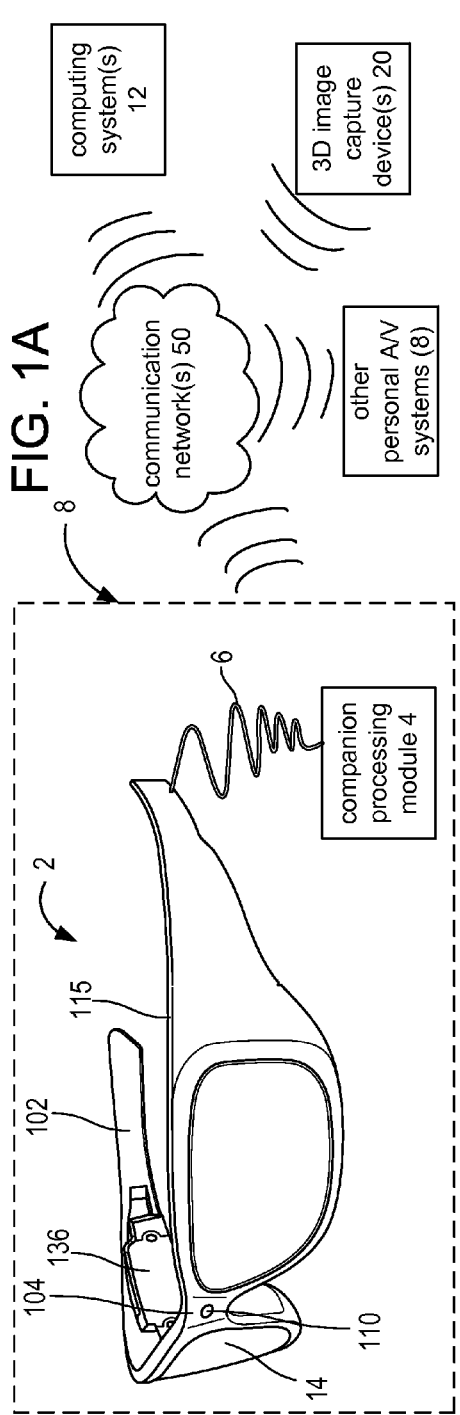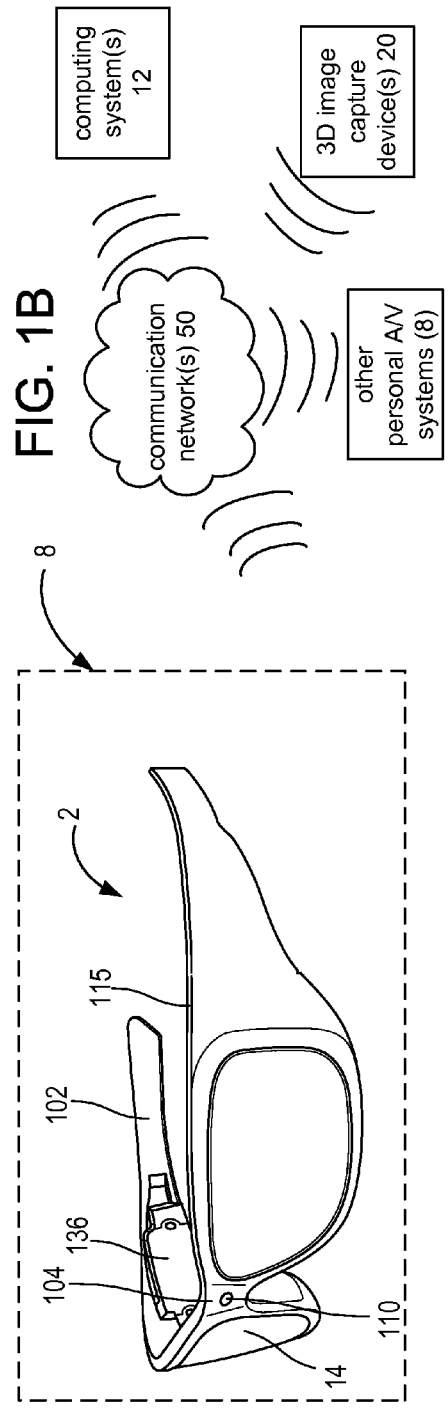

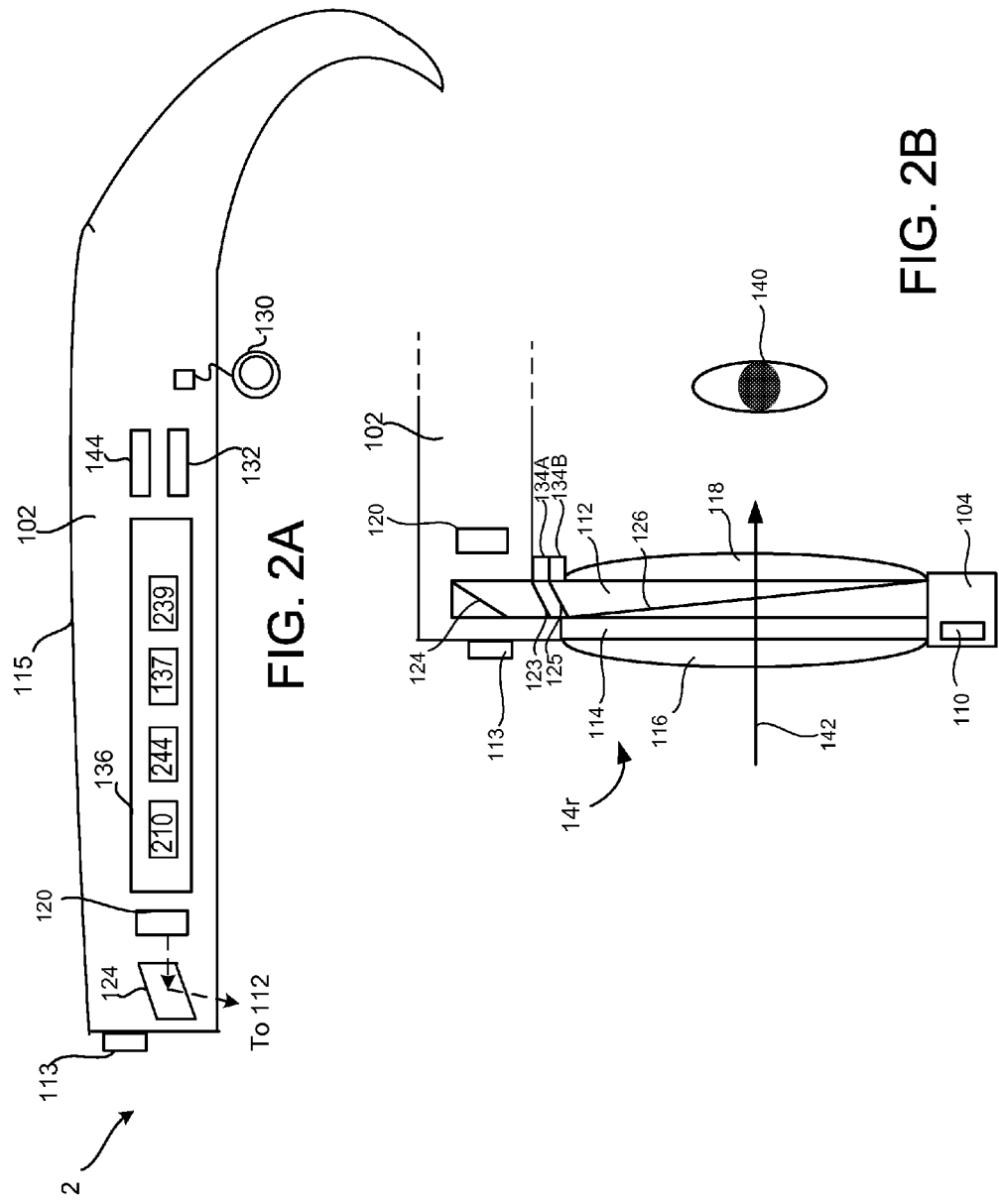

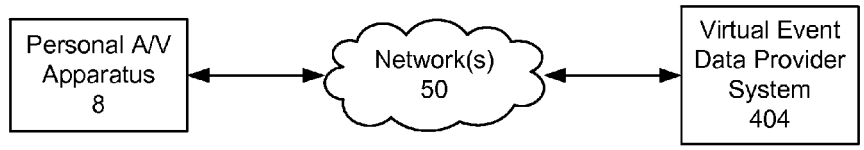
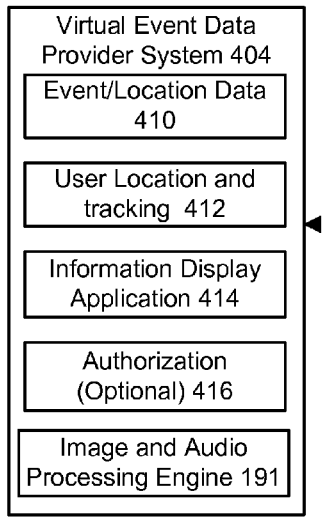
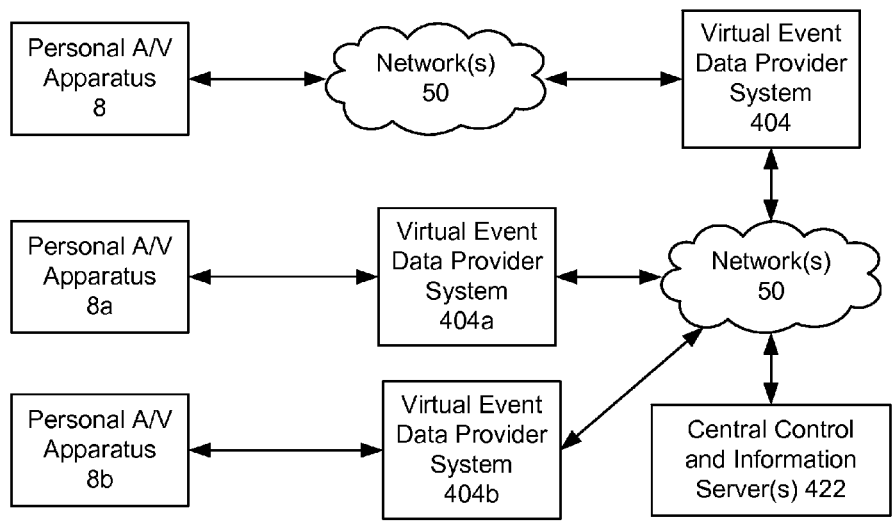

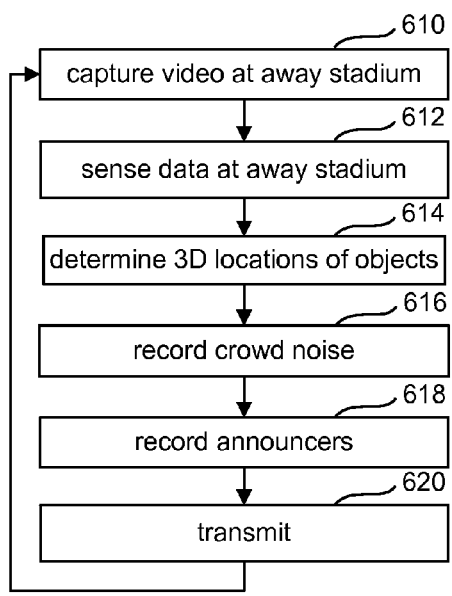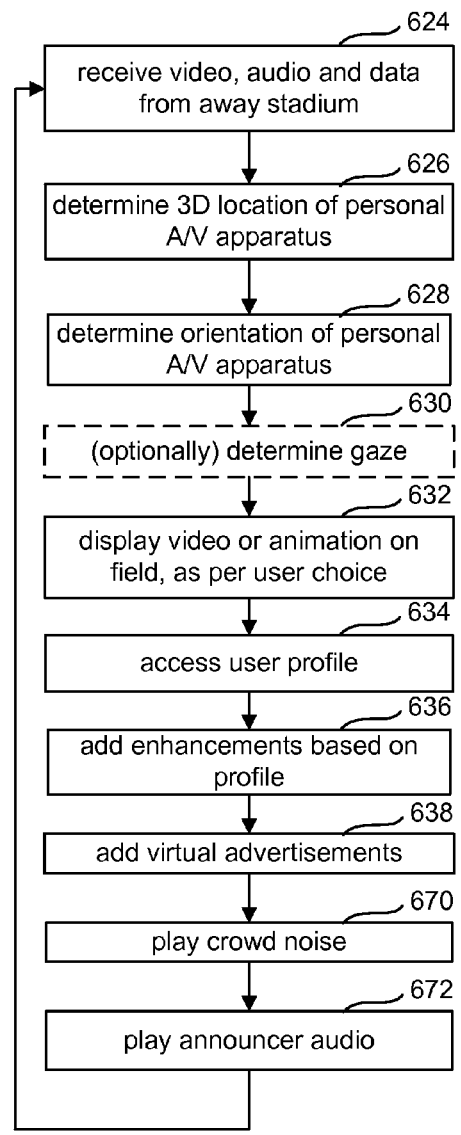

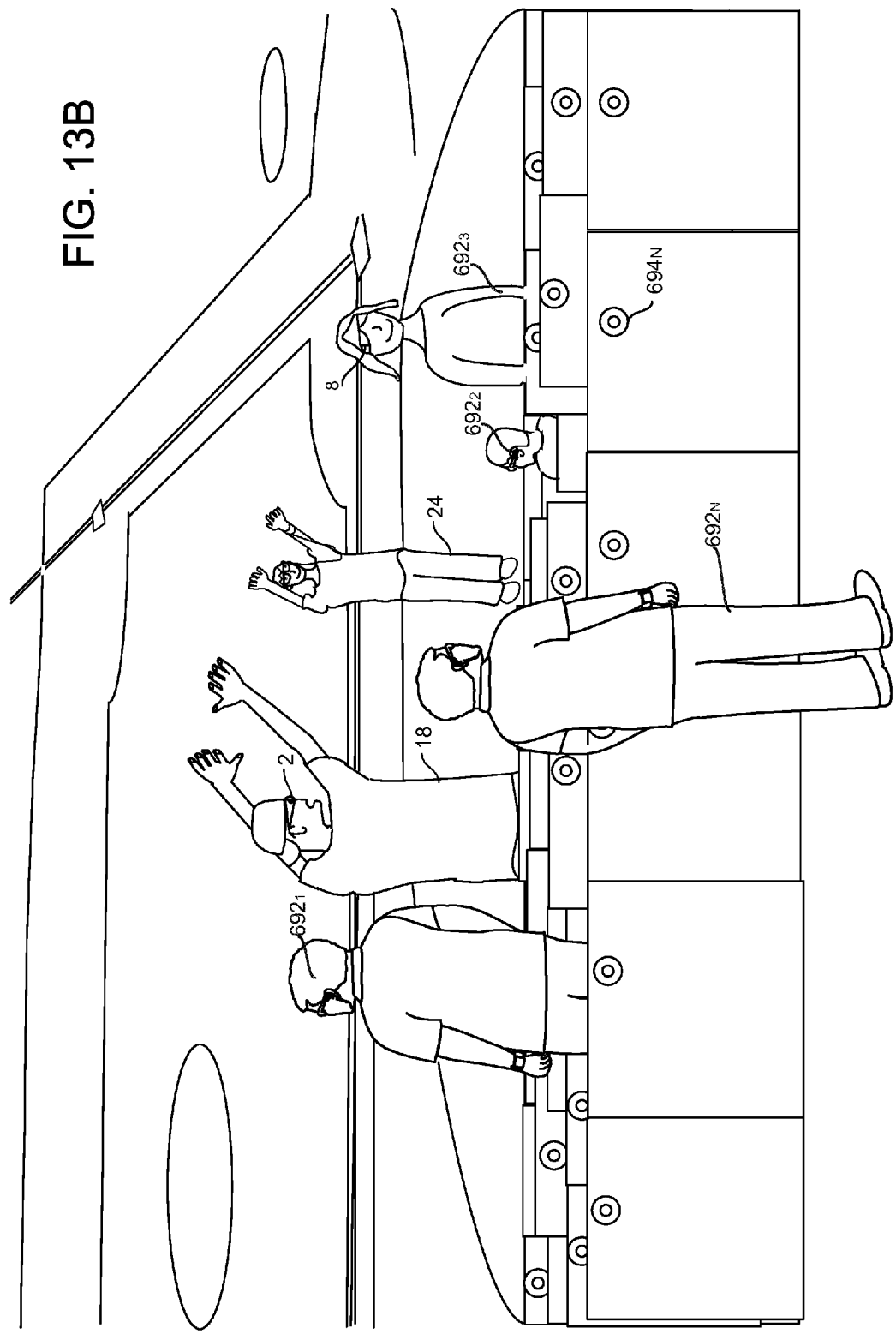

VIRTUAL SPECTATOR EXPERIENCE WITH A PERSONAL AUDIO/VISUAL APPARATUS

CROSS-REFERENCE TO RELATED APPLICATIONS

This application claims the benefit of priority as a continuation-in-part application of U.S. patent application Ser. No. 13/250,878, titled "Personal Audio/Visual System," to K. Stone-Perez et al., filed Sep. 30, 2011, and incorporated herein by reference.

BACKGROUND

Watching an event on television and being at the event are quite different experiences. Additionally, a user at an event may wish to interact with those viewing the event remotely. The spectator at the live event is limited to what he or she sees with natural sight or which the stadium personnel decide to show on big video screens at any given time. Similarly, the remote spectator is limited to the views displayed on television. Users may desire viewing the event with more control over the point of view from which to watch the event. Additionally, more opportunities for camaraderie with other users watching the event at separate locations may be desirable.

SUMMARY

Technology described herein provides various embodiments for a personal audiovisual (A/V) apparatus including a near-eye, augmented reality (AR) display apparatus that can provide a virtual spectator experience of an event for a user of the apparatus. An example of a near-eye display is a head mounted display. A virtual spectator experience allows a user to select a viewing position of an event for which image data is being captured whether the user is local or remote to the event. Image data may be moving image data like video as well as still image data. In some examples, image data of virtual objects representing real objects participating in the event are projected by the near-eye, AR display system onto a real event space at a remote location from the perspective of the user who is present at the remote location.

The technology provides one or more embodiments of a method for providing a virtual spectator experience of an event for viewing with a near-eye, augmented reality display of a personal A/V apparatus. An embodiment of the method comprises receiving in real time one or more positions of one or more event objects participating in the event occurring at a first location which is remote from a second location, mapping the one or more positions of the one or more event objects in the first 3D coordinate system for the first location to a second 3D coordinate system for a second location remote from the first location, determining a display field of view of a near-eye, augmented reality display of a personal A/V apparatus at the second location, and sending in real time 3D virtual data representing the one or more event objects which are within the display field of view to the personal A/V apparatus at the second location.

The technology provides one or more embodiments of a system for providing a virtual spectator experience of an event for viewing with a near-eye, augmented reality display of a personal A/V apparatus. The system comprising a first set of one or more processors having access to one or more memories storing a first three-dimensional (3D) coordinate system for a first location where an event is occurring in a first event space and storing a second (3D) coordinate system for a second location having a second event space for hosting a same type of event as the event occurring at the first location. The first set of one or more processors are communicatively coupled to a second set of one or more processors for receiving in real time 3D virtual data representing one or more real objects participating in the event at the first location and one or more positions of the one or more real objects in the first 3D coordinate system for the first location.

The 3D virtual data representing the one or more objects participating in the event at the first location are mapped by the first set of one or more processors to one or more positions in the second 3D coordinate system for the second location. The first set of one or more processors are communicatively coupled to a personal A/V apparatus including a near-eye, augmented reality display located at the second location and send the 3D virtual data representing one or more event objects participating in the event with respective one or more positions in the second 3D coordinate system for the second location to the personal A/V apparatus.

The technology provides one or more embodiments of one or more processor readable storage devices comprising instructions encoded thereon which instructions cause one or more processors to execute a method for providing a virtual spectator experience of an event using a personal A/V apparatus including a near-eye, augmented reality display. An embodiment of the method comprises receiving user input including a viewing position selection at a first location where the event is occurring, requesting and receiving three-dimensional (3D) virtual data of the event including 3D virtual data for the viewing position selection at the first location over a communication network from one or more computer systems which generate the 3D virtual data of the event for the viewing position selection based on received image data and depth data from one or more capture devices at the first location. A head position andorientation is determined for the near-eye, augmented reality display of the personal A/V apparatus and 3D virtual data is selected as current 3D virtual data for display in the near-eye, augmented reality display based on the head position andorientation. The current 3D virtual data is caused to be displayed in the near-eye, augmented reality display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of an embodiment of a personal audiovisual (A/V) apparatus having a near-eye, augmented reality display embodied as a see-through, augmented reality display.

FIG. 1B is a block diagram depicting example components of another embodiment of a personal audiovisual (A/V) apparatus having a near-eye, see-through, augmented reality display.

FIG. 2A is a side view of an eyeglass temple of a frame in an embodiment of the personal audiovisual (A/V) apparatus having a see-through, augmented reality display embodied as eyeglasses providing support for hardware and software components.

FIG. 2B is a top view of an embodiment of a display optical system of a near-eye, see-through, augmented reality display.

FIG. 4A is a block diagram of an embodiment of a virtual event data provider system communicatively coupled to a personal A/V apparatus for providing a virtual spectator experience to a user of the personal A/V apparatus.

FIG. 4B is a block diagram of an embodiment of a virtual event data provider system.

FIG. 4C is a block diagram of another embodiment of a virtual event data provider system communicatively coupled to a personal A/V apparatus for providing a virtual spectator experience to a user of the personal A/V apparatus.

FIGS. 8A and 8B are flow charts describing one embodiment of a method for providing a virtual spectator experience of viewing a sporting event occurring at a first stadium at a different stadium.

FIGS. 13A and 13B illustrate other examples of different display views resulting when the virtual spectator is displayed from the embodiment of the method of FIG. 11 being performed for different users at remote locations.

DETAILED DESCRIPTION

Figure 3:
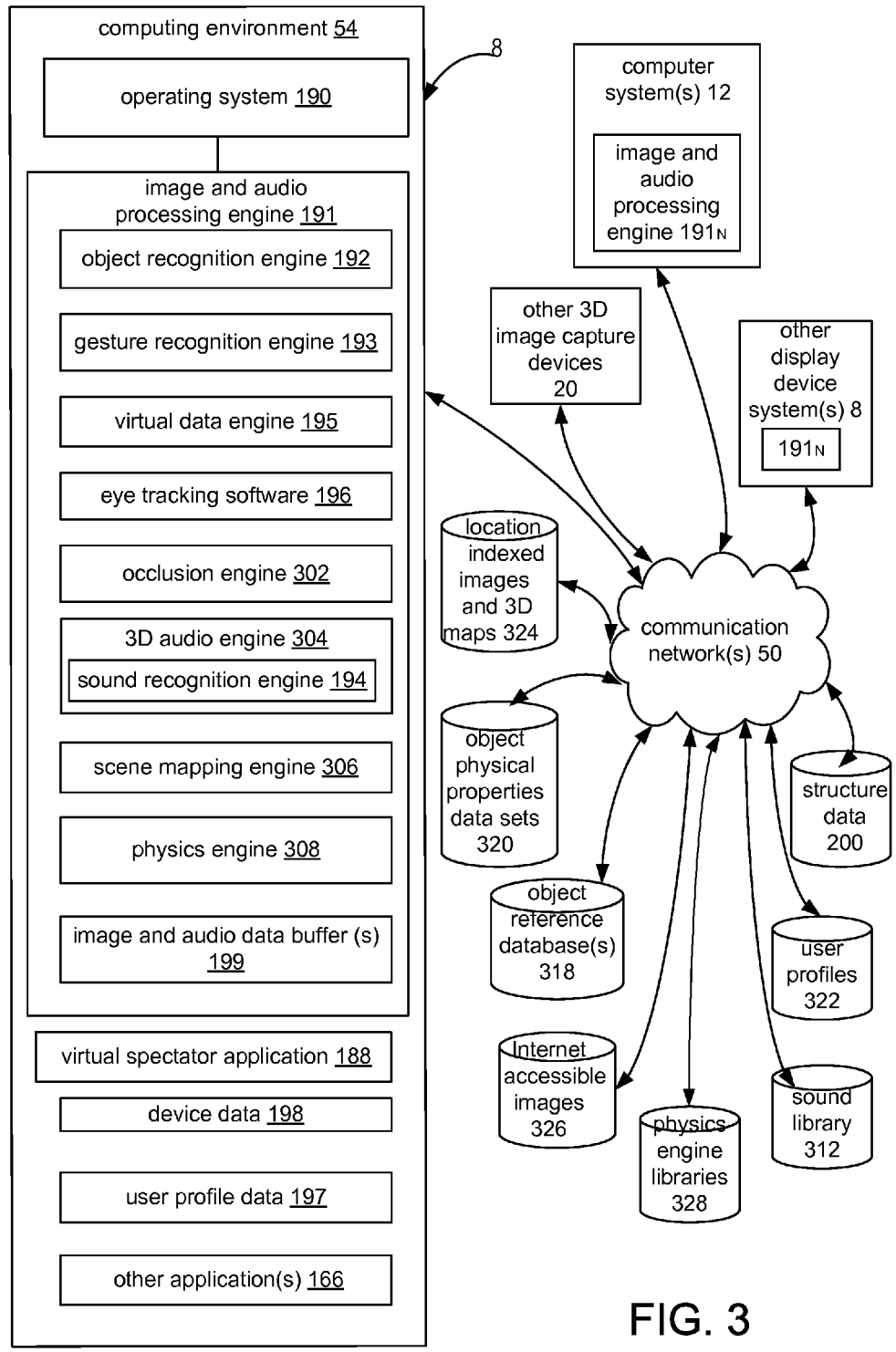
FIG. 3 is a block diagram of a system from a software perspective for providing a virtual spectator experience of an event for viewing with a near-eye, augmented reality display of a personal audiovisual (A/V) apparatus.

An augmented reality system can provide a personalized experience for a user in relation to an event being viewed from a location remote from the location where the event is occurring. An example of such a situation is where a user's sports team has an away game. That is, the game is being played at the other team's stadium. Instead of watching the game on television, the team's home stadium will be open for people to enter with their personal A/V apparatus. People in the home stadium can see the game being played remotely by their personal A/V apparatus projecting image data of one or more virtual objects representing objects participating in the event on to the field at the away stadium. In addition, the user of the personal A/V apparatus may hear the crowd noise and announcer from the game being played remotely. This will provide a more exciting experience, as compared to watching at home on television. Other enhancements such as receiving 3D image data for viewing the event from different perspectives at either the remote location or the location of the event may also be available. Additionally, receiving and displaying virtual image data of a remote user also enhances camaraderie.

An event can be other than a live event. For example, an event can be an animation or recreation of a past event which was either captured with image and depth capture devices or for which 3D objects can be generated based on the original captured data. For example, people may attend the present day Citi Field which replaced the old Shea Stadium or another location's event space today for a re-creation of the Beatles 1965 concert. Additionally, an event space is a space with defined boundaries within which a live event or animation is occurring for spectators to watch like a ball field, basketball court or a stage. Some examples of locations with event spaces are stadiums, theaters, arenas, concert halls, and other outdoor and indoor places where a stage or other event space is set-up. A remote location which a viewer may physically enter to view the event also has an event space in which the virtual objects are projected by a user's personal A/V device. In the Beatles concert example, the seating arrangement of present day Citi Field is not the same as the arrangement for the Shea Stadium of 1965. An event space may be defined on the current infield of the present stadium for a similar, but not identical, geometry to the infield in 1965. In this example, the default position of a user used in determining a display field of view of a personal A/V apparatus in which to display virtual objects for the user is his or her present day seat at present day Citi Field.

FIGS. 1A, 1B, 2A and 2B described aspects of embodiments of a personal A/V apparatus including a near-eye, augmented reality (AR) display. Utilizing the AR display, the end user may move around a real-world environment (e.g., a living room) while looking through the AR display and perceive views of the real-world overlaid with image data of a virtual object. The virtual object may appear to maintain coherent spatial relationships with the real-world environment (i.e., as the end user turns her head or moves within the real-world environment, the image data displayed to the end user will change such that the virtual object appears to exist within the real-world environment as perceived by the end user).

There are different types of augmented reality displays. A user wearing a see-through, augmented reality personal A/V apparatus actually sees with his or her natural sight a real object, which is not occluded by image data of a virtual object or virtual effects, in a display field of view of the see-through display, hence the name see-through display. For other types of augmented reality displays like video-see displays or a display operating in a video-see mode, the display is not see-through, and image data of unoccluded real objects as they would appear with natural sight are displayed for the user as well as image data of virtual objects and virtual effects.

The term "display field of view" refers to the field of view of the display portion of the personal A/V system as the display portion is what the user looks through. What a viewer sees from his point of view is his field of view. A point of view is also called a perspective. In some embodiments, a perspective of a user wearing or looking through a near-eye AR display, referred to hereafter as a user perspective or the display field of view, may be approximated by a view dependent coordinate system, having orthogonal X, Y and Z axes in which a Z-axis represents a depth position from a reference point on the front of the personal A/V apparatus or one or more points determined in relation to the front of the personal A/V apparatus like an approximate location for the user's foveae.

FIG. 1A is a block diagram depicting example components of an embodiment of a personal audiovisual (A/V) apparatus 8. Personal A/V apparatus 8 includes a see-through, augmented reality display device as a near-eye, augmented reality display device 2 in communication with a companion processing module 4 via a wire 6 in this example or wirelessly in other examples. In this embodiment, head mounted display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through, augmented reality display.

Frame 115 provides a support structure for holding elements of the system in place as well as a conduit for electrical connections. In this embodiment, frame 115 provides a convenient eyeglass frame as support for the elements of the system discussed further below. Some other example of a near-eye support structure are a visor frame or a goggles support. The frame 115 includes a nose bridge portion 104 with a microphone 110 for recording sounds and transmitting audio data to control circuitry 136. A temple or side arm 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing capture devices 113, e.g. cameras, for recording digital image data such as still images, videos or both, and transmitting the visual recordings to the control circuitry 136 which may in turn send the captured image data to the companion processing module 4 which may also send the data to one or more computer systems 12 or to another personal A/V apparatus over one or more communication networks 50.

Figure 14:
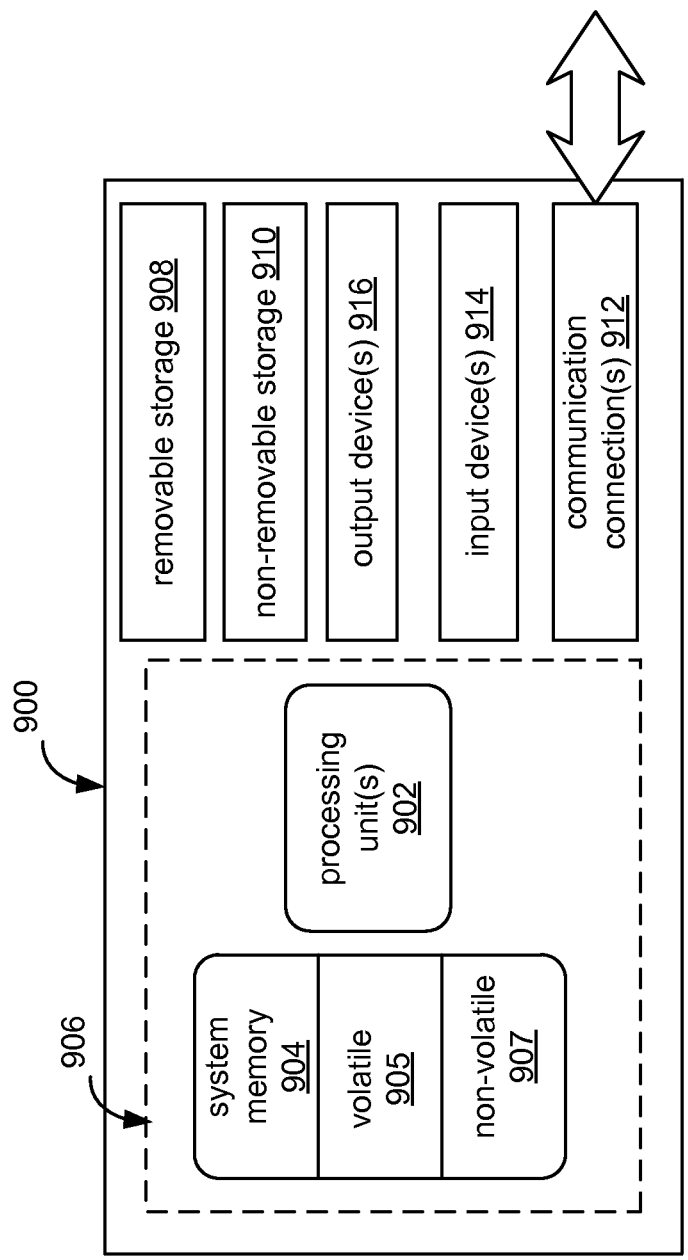
FIG. 14 is a block diagram of one embodiment of a computing system that can be used to implement a network accessible computing system or a companion processing module.

The companion processing module 4 may take various embodiments. In some embodiments, companion processing module 4 is a separate unit which may be worn on the user's body, e.g. a wrist, or be a separate device like a mobile device (e.g. smartphone). The companion processing module 4 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more computing systems 12 whether located nearby or at a remote location, other personal A/V apparatus 8 in a location or environment, for example as part of peer-to-peer communication, and if available, one or more 3D image capture devices 20 in the environment. In other embodiments, the functionality of the companion processing module 4 may be integrated in software and hardware components of the display device 2 as in FIG. 1B. Some examples of hardware components of the companion processing module 4 are shown in FIG. 14.

One or more network accessible computer system(s) 12 may be leveraged for processing power and remote data access. An example of hardware components of a computing system 12 is shown in FIG. 14. An application may be executing on a computing system 12 which interacts with or performs processing for an application executing on one or more processors in the personal A/V apparatus 8. For example, a 3D mapping application may be executing on the one or more computers systems 12 and the user's personal A/V apparatus 8. In some embodiments, the application instances may perform in a master and client role in which a client copy is executing on the personal A/V apparatus 8 and performs 3D mapping of its display field of view, receives updates of the 3D mapping from the computer system(s) 12 including updates of objects in its view from the master 3D mapping application and sends image data, and depth and object identification data, if available, back to the master copy.

Additionally, in some embodiments, the 3D mapping application executing on different personal A/V apparatus 8 in the same environment share data updates in real time, for example object identifications and occlusion data like an occlusion volume for a real object, in a peer-to-peer configuration between apparatus 8.

The shared data in some examples may be referenced with respect to a common coordinate system for the environment. In other examples, one head mounted display (HMD) apparatus 8 may receive data from another HMD apparatus 8 including image data or data derived from image data, position data for the sending HMD, e.g. GPS or IR data giving a relative position, and orientation data. An example of data shared between the HMDs is depth map data including image data and depth data captured by its front facing capture devices 113, object identification data, and occlusion volumes for real objects in the depth map. The real objects may still be unidentified or have been recognized by software executing on the HMD apparatus or a supporting computer system, e.g. 12 or another personal A/V apparatus 8. In a case of not using a common coordinate system, the second HMD can map the position of the objects in the received depth map for its user perspective based on the position and orientation data of the sending HMD. Any common objects identified in both the depth map data of a field of view of the recipient HMD device and the depth map data of a field of view of the sending HMD device may also be used for mapping.

An example of an environment is a 360 degree visible portion of a real location in which the user is situated. A user may only be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their personal A/V apparatus for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

In the illustrated embodiments of FIGS. 1A and 1B, the computer system(s) 12 and the personal A/V apparatus 8 also have network access to 3D image capture devices 20. Capture devices 20 may be, for example, cameras that visually monitor one or more users and the surrounding space such that gestures and/or movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. game application).

Capture devices 20 may be depth cameras positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a personal audiovisual (A/V) apparatus having a see-through, augmented reality display which may communicate over a communication network 50 with other devices. In this embodiment, the control circuitry 136 of the display device 2 incorporates the functionality which a companion processing module 4 provides in FIG. 1A and communicates wirelessly via a wireless transceiver (see 137 in FIG. 2A) over a communication network 50 to one or more computer systems 12.

FIG. 2A is a side view of an eyeglass temple of a frame in an embodiment of the personal audiovisual (A/V) apparatus having a see-through, augmented reality display embodied as eyeglasses providing support for hardware and software components. At the front of frame 115 is depicted one of at least two physical environment facing capture devices 113 (e.g. cameras) that can capture video and still images, typically in color, of the real world to map real objects in the display field of view of the see-through display, and hence, in the field of view of the user.

In some examples, the cameras 113 may also be depth sensitive cameras which transmit and detect infrared light from which depth data may be determined. In other examples, a separate depth sensor (not shown) on the front of the frame 115 may also provide depth data to objects and other surfaces in the field of view. The depth data and image data form a depth map of the captured field of view of the cameras 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing cameras 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The cameras 113 are also referred to as outward facing cameras meaning facing outward from the user's head. The illustrated camera 113 is a front facing camera which is calibrated with respect to a reference point of its respective display optical system 14. One example of such a reference point is an optical axis (see 142 in FIG. 2B) of its respective display optical system 14. The calibration allows the field of view of the display optical systems 14, also referred to as the display field of view, to be determined from the data captured by the cameras 113.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU), particularly in embodiments without a separate companion processing module 4, which contains at least one graphics processing unit (GPU).

Inside, or mounted to temple 102, are an ear phone 130 of a set of ear phones 130, inertial sensors 132, one or more location or proximity sensors 144, some examples of which are a GPS transceiver, an infrared (IR) transceiver, or a radio frequency transceiver for processing RFID data. In one embodiment, inertial sensors 132 include a three axis magnetometer, a three axis gyro, and a three axis accelerometer. The inertial sensors are for sensing position, orientation, and sudden accelerations of head mounted display device 2. From these movements, head position and orientation, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensor devices 144, 132, and ear phones 130 as well as the microphone 110, cameras 113 and an IR illuminator 134A, and an IR detector or camera 134B discussed below, Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object which interacts with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a light guide optical element 112, which directs the light representing the image into the user's eye.

FIG. 2B is a top view of an embodiment of one side of a see-through, near-eye, augmented reality display including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment and includes a first reflecting surface 124 (e.g., a mirror or other surface) which reflects incident light from image generation unit 120 such that light is trapped inside the waveguide. A representative reflecting element 126 represents the one or more optical elements like mirrors, gratings, and other optical elements which direct visible light representing an image from the planar waveguide 112 towards the user eye 140.

Infrared illumination and reflections, also traverse the planar waveguide 112 for an eye tracking system 134 for tracking the position of the user's eyes which may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 126 also implements bidirectional infrared (IR) filtering which directs IR illumination towards the eye 140, preferably centered about the optical axis 142 and receives IR reflections from the user eye 140. In some examples, reflecting element 126 may include a hot mirror or gratings for implementing the bidirectional IR filtering. A wavelength selective filter 123 passes through visible spectrum light from the reflecting surface 124 and directs the infrared wavelength illumination from the eye tracking illumination source 134A into the planar waveguide 112. Wavelength selective filter 125 passes the visible light and the infrared illumination in an optical path direction heading towards the nose bridge 104. Wavelength selective filter 125 directs infrared radiation from the waveguide including infrared reflections of the user eye 140, preferably including reflections captured about the optical axis 142, out of the waveguide 112 to the IR sensor 134B.

Based on eye tracking data from the eye tracking sensor 134B and image and depth data captured by front facing capture devices 113, a point of gaze is determined by one or more processors of the personal A/V apparatus 8. In one example of determining gaze or a direction of gaze, the eye tracking software executing on the one or more processors identifies a pupil position within each eye and models a gaze line for each eye extending from an approximated location of a respective fovea. The one or more processors determine a position in the display field of view where the gaze lines meet. This intersection is the point of gaze and it is within the Panum's fusional area for human eyes which is the area in which objects are in focus. Based on a 3D mapping of objects in the display field of view (see discussion of scene mapping engine in FIG. 3), an object at which the gaze lines meet is an object of focus.

In other embodiments, the eye tracking unit optics are not integrated with the display optics. For more examples of eye tracking systems for HMD devices, see U.S. Pat. No. 7,401, 920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. When the system renders a scene for the augmented reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B only show half of the head mounted display device 2. A full head mounted display device would include another set of optional see-through lenses 116 and 118, another opacity filter 114, another light guide optical element 112, another image generation unit 120, physical environment facing camera 113 (also referred to as outward facing or front facing camera 113), eye tracking assembly 134, and earphone 130. Additional details of a head mounted personal A/V apparatus are illustrated in U.S. patent application Ser. No. 12/905,952 entitled Fusing Virtual Content Into Real Content, Filed Oct. 15, 2010, fully incorporated herein by reference.

FIG. 3 is a block diagram of a system from a software perspective for providing a virtual spectator experience of an event for viewing with a near-eye, augmented reality display of a personal audiovisual (A/V) apparatus. FIG. 3 illustrates a computing environment embodiment 54 from a software perspective which may be implemented by a system like personal A/V apparatus 8, one or more remote computing systems 12 in communication with one or more personal A/V apparatus or a combination of these. Additionally, personal A/V apparatus can communicate with other personal A/V apparatus for sharing data and processing resources. Network connectivity allows leveraging of available computing resources. As shown in the embodiment of FIG. 3, the software components of a computing environment 54 comprise an image and audio processing engine 191 in communication with an operating system 190. Image and audio processing engine 191 processes image data (e.g. moving data like video or still), and audio data in order to support applications executing for a near-eye, augmented reality personal A/V apparatus 8. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, a scene mapping engine 306, an occlusion engine 302 and a physics engine 308 all in communication with each other.

The computing environment 54 also stores data in image and audio data buffer(s) 199. The buffers provide memory for receiving image data captured from the outward facing cameras 113, image data captured by other capture devices if available, image data from an eye tracking camera of an eye tracking assembly 134 if used, buffers for holding image data of virtual objects to be displayed by the image generation units 120, and buffers for both input and output audio data like sounds captured from the user via microphone 110 and sound effects for an application from the 3D audio engine 304 to be output to the user via earphones 130.

Image and audio processing engine 191 processes image data (e.g. video or image), depth and audio data received from one or more capture devices which may be available in a location. Image and depth information may come from the outward facing cameras 113 captured as the user moves his head or body and additionally based on captured data from other personal A/V apparatus 8 and other image data captured of the location such as stored image data and maps 324 or provided by other 3D image capture devices 20 in the location, e.g. capture devices 20A and 20B.

A 3D mapping of the display field of view of the augmented reality display can be determined by the scene mapping engine 306 based on captured image data and depth data for the display field of view. The 3D mapping includes 3D space positions or position volumes for objects. A 3D space is a volume of space occupied by the object. Depending on the precision desired, the 3D space can match the 3D shape of the object or be a less precise bounding volume around an object like a bounding box, a bounding 3D elliptical shaped volume, a bounding sphere or a bounding cylinder. A 3D space position or position volume represents position coordinates for the boundary of the volume or 3D space. In other words the 3D space position identifies how much space an object occupies and where in the display field of view that occupied space is.

A depth map can represent the captured image data and depth data. A view dependent coordinate system may be used for the mapping of the display field of view as how a collision between objects appears to a user depends on the user's point of view. An example of a view dependent coordinate system is an x, y, z coordinate system in which the z-axis or depth axis extends orthogonally or as a normal from the front of the see-through display. In some examples, the image and depth data for the depth map representing the display field of view is received from the cameras 113 on the front of the display device 2. The display field of view may also be determined remotely or using a combination of remote (e.g. 12 or another display system 8) and local processing.

Mapping what is around the user in the user's environment can be aided with sensor data. Data from an orientation sensing unit 132, e.g. a three axis accelerometer and a three axis magnetometer, determines position and orientation changes of the user's head and correlation of those head position and orientation changes with changes in the image and depth data from the front facing cameras 113 can identify positions of objects relative to one another and at what subset of an environment a user is looking. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 306 can also use a view independent coordinate system for 3D mapping. The map can be stored in the view independent coordinate system in a storage location (e.g. 324) accessible as well by other personal A/V apparatus 8, other computer systems 12 or both, be retrieved from memory and be updated over time as one or more users enter or re-enter the environment. In some examples, image and object registration into a common coordinate system may be performed using an extrinsic calibration process. The registration and/or alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 306 may first search for a pre-generated 3D map identifying 3D space positions or position volumes and identification data of objects stored locally or accessible from another personal A/V apparatus 8 or a network accessible computer system 12. The map may include stationary objects.

The map may also include objects moving in real time and current light and shadow conditions if the map is presently being updated by another system. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible database like image and map database(s) 324.

The environment may be identified by location data which may be used as an index to search in location indexed image and pre-generated 3D map databases 324 or in Internet accessible images 326 for a map or image related data which may be used to generate a map. For example, location data such as GPS data from a GPS transceiver 144 on the display device 2 may identify the location of the user. Additionally, an IP address of a WiFi hotspot or cellular station to which the personal A/V apparatus 8 has a connection can identify a location. Cameras at known positions within a location may identify the user and other people through facial recognition. Additionally, identifier tokens may be exchanged between personal A/V apparatus 8 via infra-red, Bluetooth or WUSB. The range of the infra-red, WUSB or Bluetooth signal can act as a predefined distance for determining proximity of another user. Maps and map updates, or at least object identification data may be exchanged between personal A/V apparatus via infra-red, Bluetooth or WUSB as the range of the signal allows.

An example of image related data which may be used to generate a map is meta data associated with any matched image data, from which objects and their positions within a coordinate system for the environment can be identified. For example, a relative position of one or more objects in image data from the outward facing cameras 113 of the user's personal A/V apparatus 8 can be determined with respect to one or more GPS tracked objects in the location from which other relative positions of real and virtual objects can be identified.

As described in the discussion of FIGS. 1A and 1B, image data for mapping an environment can come from cameras other than those 113 on the user's display device 2. Image and depth data from multiple perspectives can be received in real time from other 3D image capture devices 20 under control of one or more network accessible computer systems 12 or from at least one other personal A/V apparatus 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment. The scene mapping engine 306 identifies the position and tracks the movement of real and virtual objects in the volumetric space based on communications with the object recognition engine 192 of the image and audio processing engine 191 and one or more executing applications 166 generating virtual objects. The scene mapping engine 306 may be in communication with other scene mapping engines 306 executing in other systems (e.g. 12 and 8).

In some instances, a scene mapping engine 306 on a network accessible computer system 12 receives image data of multiple display fields of view from multiple augmented reality personal A/V apparatus 8 in an environment and correlates their image data based on capture times for the data in order to track changes of objects and lighting and shadow in the environment in real time. 3D map updates can then be sent to the multiple personal A/V apparatus 8 in the environment. (For more information on collaborative scene mapping between HMDs like system 8 and network accessible computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

In some examples, a 3D mapping, whether it be a depth map generated by front facing cameras 113 including a display field of view, a 3D mapping of an environment or a location in a view independent coordinate system, or somewhere in between, may be modeled as a 3D mesh of an environment. A mesh may comprise a detailed geometric representation of various features including real and virtual objects and surfaces thereof within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety. 3D mesh representations of virtual objects can be added.

The object recognition engine 192 of the image and audio processing engine 191 detects, tracks and identifies real objects in the display field of view and the 3D environment of the user based on captured image data and depth data if available or determined depth positions from stereopsis. The object recognition engine 192 distinguishes real objects from each other by marking object boundaries and comparing the object boundaries with structural data. One example of marking object boundaries is detecting edges within detected or derived depth data and image data and connecting the edges. The object boundary data is then compared with stored structure data in order to identify a type of object within a probability criteria. A polygon mesh may also be used to represent the object's boundary as mentioned above. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The structure data 200 may store structural information as image data or use image data as references for pattern recognition. The image data may also be used for facial recognition. The object recognition engine 192 may also perform facial and pattern recognition on image data of the objects based on stored image data from other sources as well like user profile data 197 of the user, other users profile data 322 accessible by a network accessible, location indexed images and 3D maps 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in objects reference database(s) 318. An object physical properties data set 320 may be created for a detected real object which may include properties data fields also found in an object reference data set 318 like type of object, type of materials, pattern, color, 3D shape, 3D structure model, 3D size and object boundary data.

Upon detection of one or more objects by the object recognition engine 192, image and audio processing engine 191 may report to operating system 190 an identification of each object detected and a corresponding position and/or orientation which the operating system 190 passes along to other executing applications like the scene mapping engine 306, the occlusion engine 302, the physic engine 308 and other upper level applications 166.

The occlusion engine 302 identifies spatial occlusions between objects, and in particular between real and virtual objects based on spatial position data for recognized objects within a coordinate system as updated by the objection recognition engine 192 and the scene mapping engine 306. As virtual and real objects have size and shape, a 3D space position for each object may be defined by the scene mapping engine to incorporate the volume occupied by each object. In the case of complete occlusion of a virtual object by a real object, the occlusion engine can notify the virtual data engine 195 to not display the virtual object. In the case of complete occlusion of the real object by the virtual object, the virtual object or its parts can be sized to completely cover the real object and its parts. For partial occlusions, the display is updated to show part of the virtual object and part of the real object. In the example of FIG. 3A, when Joe 18 looks at the ball he is holding, the occlusion engine 302 modifies the surface boundary displayed of the ball so Joe's hands block parts of the ball. For more information about occlusion processing, see U.S. patent application Ser. No. 12/905,952 entitled "Fusing Virtual Content into Real Content," Flaks et al., and filed Oct. 15, 2010, which is hereby incorporated by reference and see also U.S. patent application Ser. No. 13/443,368 entitled "Realistic Occlusion for a Head Mounted Augmented Reality Display" Geisner et al., and filed Apr. 10, 2012, which is hereby incorporated by reference.

The 3D audio engine 304 is a positional 3D audio engine which receives input audio data and outputs audio data for the earphones 130 or other output audio devices like speakers in other embodiments. The received input audio data may be for a virtual object or be that generated by a real object. Audio data for virtual objects generated by an application can be output to the earphones to sound as if coming from the direction of the virtual object projected into the display field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference. Audio data from a sound library 312 may be associated with one or more collisions or actions for a particular physics model by an application or a user so that the physics engine 308 will play the audio data during display of one or more collisions or actions.

Sound recognition software engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, personal A/V apparatus 8 and 3D image capture devices 20 in a location upload their captured audio data to a network accessible computing system 12. Additionally, pre-generated 3D maps of a location can provide an audio index of sounds of objects fixed in the location or which enter and leave the location on a regular basis, e.g. train and bus sounds.

An embodiment of a natural user interface (NUI) in one or more embodiments of the physical A/V apparatus 8 may include the outward facing capture devices 113 and the gesture recognition engine 193 for identifying a gesture which is an example of at least one user physical action of at least one body part. An eye tracking assembly like the one described earlier with components 134A, 134B, 123, 125, and 126 and the eye tracking software 196 for interpreting eye movements based on the data captured by the assembly may also be components in another embodiment of a natural user interface for the physical A/V apparatus 8. Eye based actions like a blink sequence indicating a command, a gaze pattern, or gaze duration identified by the eye tracking software 196 are also some examples of user input as one or more user physical actions of at least one body part. The microphone and sound recognition engine 194 can also process natural user input of voice commands which may also supplement other recognized physical actions such as gestures and eye gaze.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

Just as application can upload gesture filters to indicate controls in their games, an application can identify or register an action which is a pre-collision event or a collision trigger or a collision itself as a gesture for processing by the physics engine. Upon recognizing the gesture, the gesture recognition engine 193 notifies the physics engine 308. An example of such a gesture as a collision is Joe's holding the ball in FIG. 3A. The gesture recognition engine 193 can identify the throw gesture based on image and depth data from the front facing cameras 113 on his display device 2 or from captured data from the environment depth cameras or from another display device's capture data, or a combination of these.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The gesture recognition engine 193 processing the input image and depth data implements a natural user interface (NUI) in that the engine 193 identifies a user physical action of a body part that is interpreted as a command or request for data. In the embodiment of FIG. 3, the natural user interface also includes the eye tracking software 196 and the eye tracking system 134 in that other user physical actions of a body part such as an eye can be interpreted as commands or requests. The eye tracking software 196 can identify gaze direction or a point of gaze based on pupil position and eye movements, e.g. a blink sequence, indicating a command or request. The sound recognition engine 194 can also form part of the natural user interface in that it can provide supplemental data to clarify a command or request by a user physical action of speech made by the larynx.

The physics engine 308 simulates the physics of motion of objects and the exchange of energy between objects as forces are applied to them. A physics simulator uses rules for a specific context or environment. An application can define a physics environment. For example, an environment having a different gravitational force than Earth's can be requested by inputting different environmental parameters. In the illustrative examples discussed herein, Newton's laws of physics are used as the illustrative rules for a physical environment. For more information about a physics engine like physics engine 308 which models virtual and real objects, and collisions, and collision effects for a near-eye, AR display, see U.S. patent application Ser. No. 13/458,800, McCulloch et al., entitled "Displaying a Collision Between Real and Virtual Objects," filed Apr. 27, 2012, which is hereby incorporated herein by reference.

Virtual data engine 195 processes virtual objects and registers the 3D position and orientation of virtual objects or imagery in relation to one or more coordinate systems, for example in display field of view coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

The following discussion describes some example processing for updating a see-through, augmented reality display to position virtual objects so that they appear realistically at 3D locations determined for them in the display. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 only displays the virtual objects as the display device is a see-through display device. For a virtual object, the virtual data engine 195 has a target space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

For a video-see, augmented reality display or operation of a see-through display in a video-see mode, image data of the real objects is also written into the corresponding color buffer with the virtual objects. The opacity filter of each see-through display optical system 14 can be tuned so that light reflected from in front of the glasses does not reach the user's eye 140 and the 3D image data of both the real and virtual objects is played on the display.

Device data 198 may include a unique identifier for the computer system 8, a network address, e.g. an IP address, model number, configuration parameters such as devices installed, identification of the operating system, and what applications are available in the personal A/V apparatus 8 and are executing in the display system 8 etc. Particularly for the see-through, augmented reality personal A/V apparatus 8, the device data may also include data from sensors or determined from the sensors like the orientation sensors 132, the temperature sensor 138, the microphone 110, and the one or more location and proximity transceivers 144.

Like other applications 166 for execution on a personal A/V apparatus including a near-eye, augmented reality display, a virtual spectator application 188 leverages the various engines of the image and audio processing engine 191 for implementing its one or more functions by sending requests identifying data for processing and receiving notification of data updates. For example, notifications from the scene mapping engine identify the positions of virtual and real objects in an event space, for example at each event space at different locations. The virtual spectator application 188 identifies data to the virtual data engine 195 for generating the structure and physical properties of an object. The virtual spectator application 188 may supply and identify a physics model for each virtual object generated for its application to the physics engine 308, or the physics engine 308 may generate a physics model based on the object physical properties data set $320_N$ for the object.

The operating system 190 makes available to applications such as the virtual spectator application 188 which gestures the gesture recognition engine 193 has identified, which words or sounds the sound recognition engine 194 has identified, the positions of objects from the scene mapping engine 306 as described above, and eye data such as a position of a pupil or an eye movement like a blink sequence detected from the eye tracking software 196. A sound to be played for the user in accordance with the virtual spectator application 188 can be uploaded to a sound library 312 and identified to the 3D audio engine 304 with data identifying from which direction or position to make the sound seem to come from. The device data 198 provides location, head position and head orientation with respect to the ground to the virtual spectator application 188 as well as to other applications 166.

As indicated in FIG. 3, the virtual spectator application 188 can operate on a computer system 12 as well as on a personal A/V apparatus. For example, one or more computer systems 12 may be one or more servers at a location handling multiple virtual data streams for multiple personal A/V apparatus at the location. The local copy on the personal A/V apparatus 8 may send device data identifying a user position within the location or environment as well as image and depth data of its field of view and sensor data indicating head position and orientation and gaze direction. In some examples, the server executing version of the virtual spectator application sends a virtual data set of more data surrounding the field of view, and the copy of the virtual spectator apparatus selects which virtual data to display from this set based on current head position and orientation. The selection of virtual data for display may also be based on gaze direction detected.

FIG. 4A is a block diagram of an embodiment of a virtual event data provider system 404 communicatively coupled via one or more communication networks 50 to a personal A/V apparatus 8 for providing a virtual spectator experience to a user of the personal A/V apparatus. A virtual event data provider system 404 may be implemented by one or more computer systems 12 executing a virtual spectator application 188. One or more networks 50 can include wired and/or wireless networks, such as a LAN, WAN, WiFi, the Internet, an Intranet, cellular network etc. No specific type of network or communication means is required. In some embodiments, virtual event data provider system 404 executing software such as the virtual spectator application is located locally to personal A/V apparatus 8 so that they communicate over a local area network, WiFi, Bluetooth or other short range communication means. In other embodiments, a virtual event data provider systems 404 is located remotely from personal A/V apparatus 8 so that they communication over the Internet, cellular network or other longer range communication means.

FIG. 4B shows an example architecture for one or more processes and/or software running on virtual event data provider system 404. Virtual event data provider system 404 may create and provide virtual event data or location data, or may provide services which transmit virtual event data or location data from third party event data providers 418 to a user's personal A/V apparatus 8. Multiple virtual event data provider systems and third party event data providers may be utilized with the present technology. A virtual event data provider system 404 includes data storage for virtual event data 410, user location and tracking data 412, information display applications 414, an example of which is the virtual spectator application 188, optionally an authorization component 416, and the image and audio data processing engine 191 discussed above.

Event and/or location data can include supplemental event and location data 410 about one or more events known to occur within specific periods and/or about one or more locations that provide a customized experience. User location and tracking module 412 keeps track of various users which are utilizing the system. Users can be identified by unique user identifiers, location and other elements. An information display application 414 like the virtual spectator application 188 allows customization of both the type of display information to be provided to users and the manner in which it is displayed. In some embodiments, the display processing occurs at the virtual event data provider system 404. In other embodiments, information is provided to personal A/V apparatus 8 so that personal A/V apparatus 8 determines which information is to be displayed and where, within the display, the information is to be located. Third party virtual event data provider systems 404 can provide various types of data for various types of events, as discussed herein.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the application on the virtual event data provider systems 404 and on the personal A/V apparatus 8.

FIG. 4C shows another configuration embodiment in which virtual event data provider system 404 is located locally to personal A/V apparatus 8, and virtual event data provider system 404 is in communication with Central Control and Information Server(s) 422 via one or more communication networks 50. In one embodiment, one or more networks 50 can include wired and/or wireless networks, such as a LAN, WAN, WiFi, the Internet, an Intranet, cellular network etc. No specific type of network is required. Central Control and Information Server(s) 422 is/are located remotely from virtual event data provider system 404.

In one embodiment, Central Control and Information Server(s) 422 provide central control and data storage for multiple virtual event data provider systems 404, 404a, 404b, . . . which are in communication with respective personal A/V apparatus 8, 8a, 8b, . . . . Each of the virtual event data provider systems 404, 404a, 404b, . . . are at different locations and able to connect to any personal A/V apparatus 8 that is within a geographic region of the respective virtual event data provider system.

The virtual event data, which includes virtual objects representing objects participating in an event, is provided in real-time as the live event or animation proceeds or as the user interacts at the location of interest. Supplemental information such as overlays and information about those participating in an event may also be displayed. Various types of supplemental information and presentations may be utilized in accordance with the teachings below.

Figure 5:
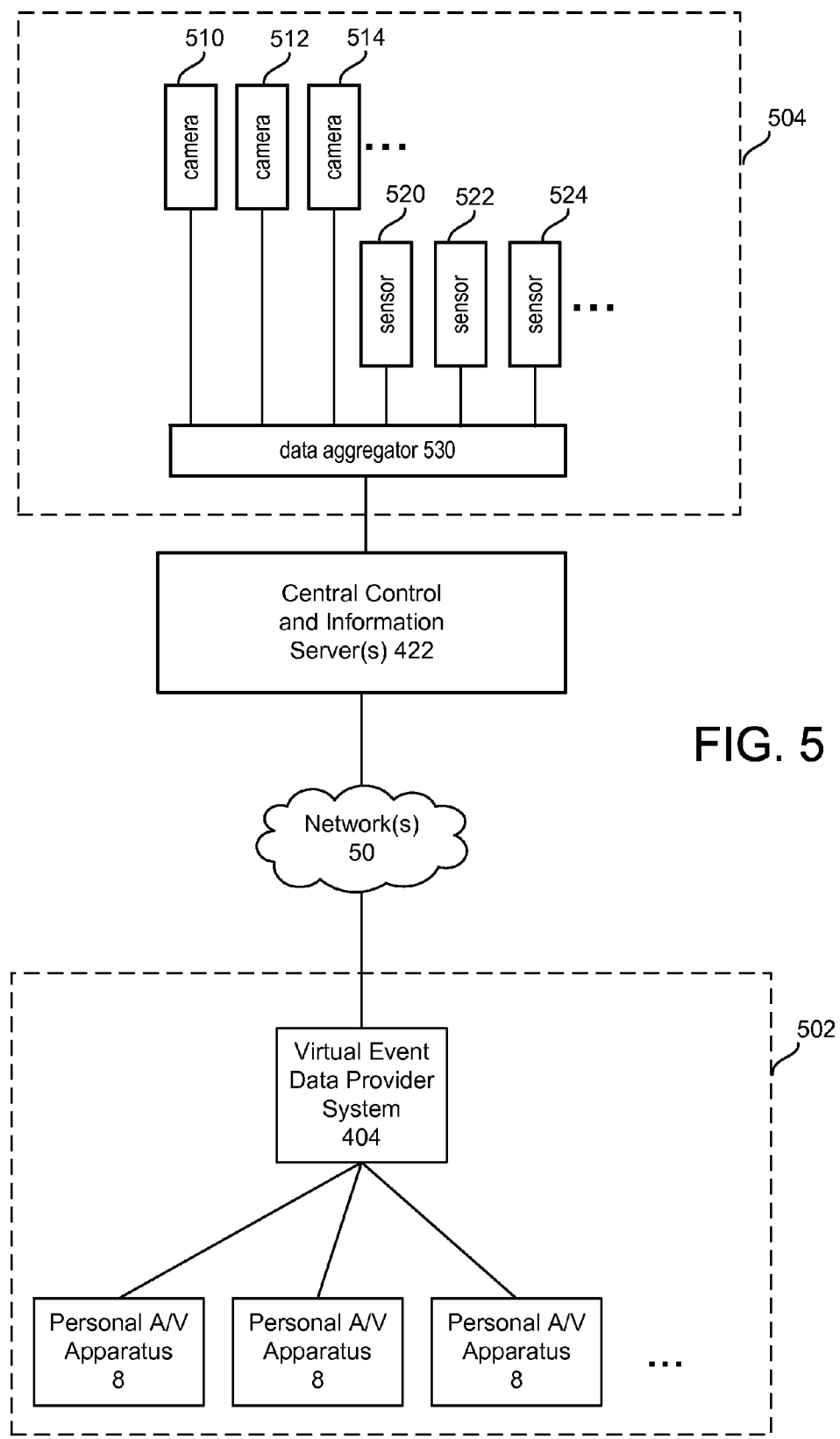
FIG. 5 is a block diagram of an embodiment of a system for providing event data to a virtual event data system to enable viewing an event remotely at a different location with a personal A/V apparatus.

FIG. 5 is a block diagram of an embodiment of a system for providing event data to a virtual event data system to enable viewing an event remotely at a different location with a personal A/V apparatus. In the depicted example, an embodiment of a system provides a virtual spectator experience for the user watching a sporting event at the home stadium while the sporting event is being played at the away stadium. FIG. 5 shows equipment at the home stadium 502 and equipment at the away stadium 504. At the away stadium 504 are a set of cameras 510, 512, 514, . . . and a set of sensors 520, 522, 524, . . . . In many embodiments there are multiple cameras to capture three dimensional (3D) video from multiple perspectives of the game. There are multiple sensors for sensing the pan, tilt, zoom, and focal length of the cameras, as well as the location and orientation of the players and objects being used during the game. The sensors can be used to determine location and/or orientation of players, moving objects (balls, bats, racquets, automobiles, . . . ) and cameras. Additionally, one or more sensors can be used to manually input data about the sporting event.

Although not shown, there may also be a similar arrangement of cameras and sensors at the home stadium as a user at the home stadium may wish to change her viewing position of the virtual depiction of the event in the event space of the home stadium.

All this data and video is sent to data aggregator 530 (one or more servers) which aggregates the data and sends it to Central Control and Information Server 422. In one embodiment, the central control and information server(s) 422 may be executing a scene mapping engine 306 which continuously updates a 3D mapping of objects in the first location in a view independent 3D coordinate system for the first location. The 3D coordinate system for the event location, the 3D mapping including position volumes or 3D spaces for at least stationary objects and virtual data for stationary objects like walls can be sent in an initialization stage. Additionally, virtual data for equipment, e.g. the football, and virtual data for event participants such as players and coaches for each team as well as referees can be sent in an initialization or start-up phase between the central control and information server 422 and one or more virtual event data provider systems 404 at different locations via one or more communication networks 50. Updates to the virtual data can be determined and sent by the information server 422 over the one or more communication networks 50 to the one or more virtual event data providers 404 at locations where users are present like at the home stadium.

In some embodiments, the virtual data representing the event participants may be based on pre-defined avatar models of the players and referees. For example, virtual object models including structure data, image data representing features like clothing, hair color, and the like and physics models can be generated for the real objects or animated objects participating in the event or retrieved from memory. In other examples, the virtual data representing an event participant is a virtual object which is a composite of actual 3D image data of the participant generated from aligning overlapping image data captured in real time from the multiple camera perspectives. When real time captured image data is used, the home stadium viewer sees the actual perspiration of the player.

The data is then sent to a Virtual event data provider system 404 via one or more communication networks 50. In this embodiment, virtual event data provider system 404 is located at the home stadium 502 and wirelessly transmits the virtual event data to a set of personal A/V apparatus 8 at the event. In one embodiment, there can be thousands of people at the home stadium 502 using their own personal A/V apparatus 8, each of which is in communication with the virtual event data provider system 404. The virtual event data provider system 404 may be executing a scene mapping engine 306 which continuously updates a 3D mapping of the first location in a view independent 3D coordinate system for the first location. The virtual event data provider system 404

For illustrative purposes, the method embodiments below are described in the context of the system embodiments described above. However, the method embodiments are not limited to operating in the system embodiments described above and may be implemented in other system embodiments. Furthermore, the method embodiments are continuously performed.

Figure 6:
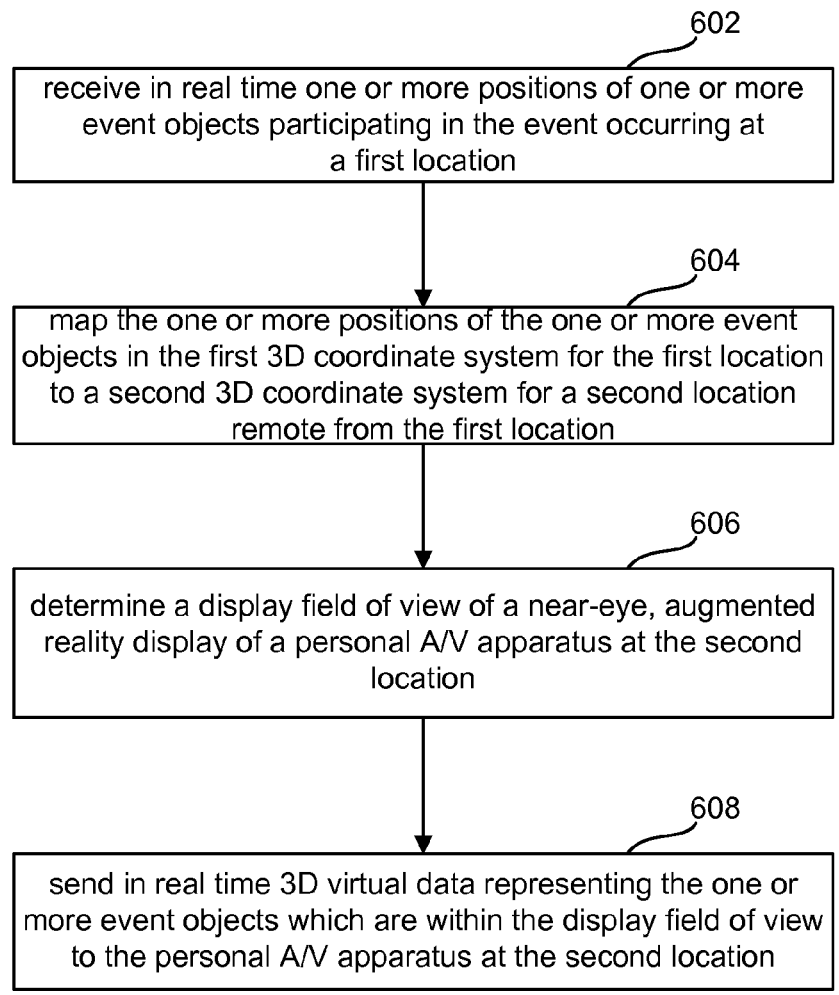
FIG. 6 is a flowchart of an embodiment of a method for providing a virtual spectator experience of an event for viewing with a near-eye, augmented reality display of a personal A/V apparatus.

FIG. 6 is a flowchart of an embodiment of a method for providing a virtual spectator experience of an event for viewing with a near-eye, augmented reality display of a personal A/V apparatus. This embodiment is discussed for illustrative purposes from the perspective of a virtual spectator application 188 and image and audio processing engine 191 executing in a virtual event data provider system 404. Although descriptive names are giving to software modules or applications for illustrative purposes, the functionality is not limited to being performed by applications of a particular descriptive name.

In step 602, the virtual event data provider system 404 receives in real time one or more positions of one or more event objects, like a guitarist playing on stage at a concert or the football in a game, participating in the event occurring at a first location. With the aid of a scene mapping engine, the virtual spectator application 188 in step 604 maps the one or more 3D space positions or position volumes of the one or more event objects in the first 3D coordinate system for the first location to a second 3D coordinate system for a second location remote from the first location. An example of a first location is the away stadium and an example of a second location is the home stadium of FIG. 5. In step 606, based on image and depth data captured by capture devices 113 of a respective personal A/V apparatus 8 and transmitted to the virtual event data provider 404, a scene mapping engine 306 of the provider 404 determines a display field of view of a near-eye, augmented reality display of the respective personal A/V apparatus 8 at the second location 608. Besides image and depth data from the capture devices 113, location data and head position and head orientation data stored for sensing units 132 and 144 in device data 198 of the respective apparatus may also be received by and used by the scene mapping engine 306 of the virtual data event provider 404 for determining the display field of view. The virtual data event provider 404 sends in real time 3D virtual data representing the one or more event objects which are within the display field of view to the respective personal A/V apparatus 8 at the second location. The steps of FIG. 6 are repeated while a user wearing the personal A/V apparatus 8 is at the stadium and desires to run the virtual spectator application 188.

Figure 7A:
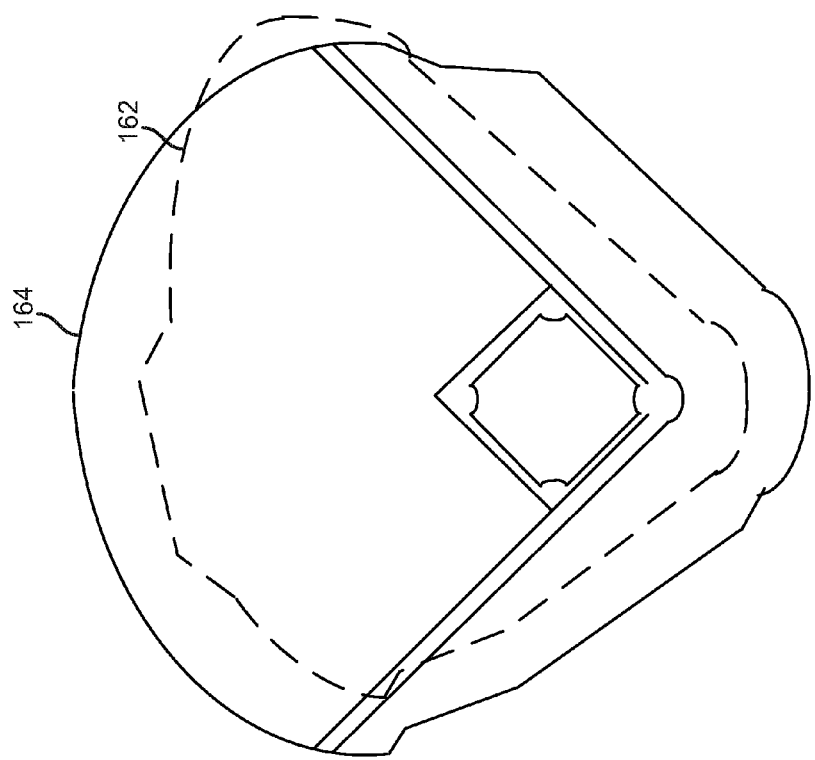
FIGS. 7A and 7B illustrate examples of different events spaces, baseball fields, with similar geometries.
Figure 7B:
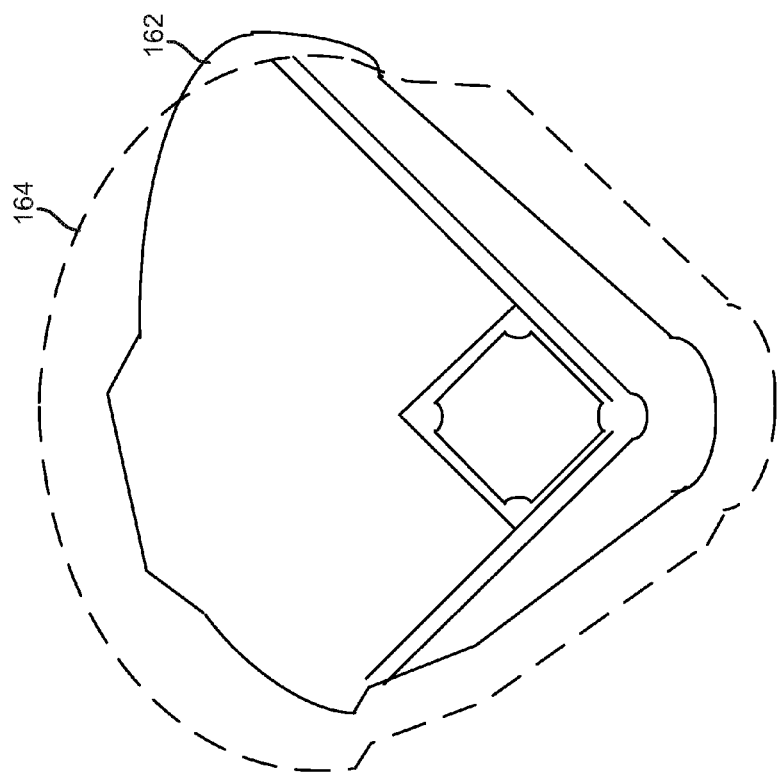

FIGS. 7A and 7B illustrate examples of different events spaces, baseball fields, with similar geometries. For implementing the embodiment of FIG. 6 in this example, there is a 3D coordinate system for the first baseball field 162 mapping position volumes of objects and a 3D coordinate system for the second baseball field 164 mapping position volumes of objects. In these examples, event spaces are not identical. As illustrated, the infields may have standard geometries, but the outfields vary in size and shape. In some examples, the virtual spectator application 188 may adjust the action of the virtual event objects to conform to geometry at a remote location. For example, make a baseball go into the stands are the larger stadium 164 to show a home run, even though if live at the larger stadium, the ball would have fallen to the infield and not been a home run. In other examples, events are not resized. Supplemental overlay data may be displayed to show the differences in the event spaces.

FIGS. 8A and 8B are flow charts describing one embodiment of a method for providing a virtual spectator experience of viewing a sporting event occurring at a first stadium at a different stadium. FIG. 8A is a flowchart describing one embodiment of processes which may be performed by the equipment shown in FIG. 5 at the away stadium 504, while the game is being played at away stadium 504. In step 610, video is captured at the away stadium. For example, video can be captured at multiple cameras to provide multiple perspectives of the game for generating 3D video. In step 612, data is sensed at the away stadium using the various sensors described above (520, 522, 524, . . . ). In step 614, data aggregator 530 will determine the location of one or more moving objects for which the sensors obtained data in step 612. Some examples of sensors include inclinometers, gyros, GPS sensors, radar, IR sensors, etc. In step 616, crowd noise at the away stadium is recorded. In step 618, announcers at the away stadium are recorded. In step 620, the information captured and/or recorded in steps 610-618 are transmitted to the various personal A/V apparatus 8 at the home stadium 502.

FIG. 8B is a flowchart describing the process performed by the various personal A/V apparatus 8 at the stadium 502. In step 624, the personal A/V apparatus 8 will receive the video, audio, and data from the away stadium. In step 626, the personal A/V apparatus will determine the three dimensional location of the personal A/V apparatus. In step 628, the orientation of the personal A/V apparatus is determined. In step 630, the gaze of the user is optionally determined. In step 632, actual video or animation of the game at that away stadium is displayed by projecting it onto the field when the user looks through the personal A/V apparatus. The video or animation is typically in 3D.

The user can choose to display actual video or animation. An animation can be created by using the data from the sensors that track the movement of the players, objects, balls, etc. and create the animation to show what's happening. A person looking at the field at the home stadium without a personal A/V apparatus will not see anything but an empty field. A person looking through the A/V apparatus will see the field and the video or animation projected onto the field.

In step 634, the personal A/V apparatus will access the user profile for the particular user. In step 636, enhancements will be added to the video or animation based on the user profile. For example, various players can be highlighted and/or various portions of the field can be highlighted based on what the user profile indicates the user is interested in. For example, a user's favorite player will be highlighted with a cloud in front of or behind the player. In a football game, the first down line can be graphically depicted. Other enhancements can also be used. The enhancements based on the user profile provides a customized experience for the user. In step 638, virtual advertisements can be added by superimposing an image of an advertisement on the field or other portion of the stadium. Note that the video displayed in 632, the enhancements displayed in 636, and the virtual advertisements displayed in step 638 are added to the user's field of view based on the three dimensional location of the personal A/V apparatus, the orientation of the personal A/V apparatus and optionally the gaze of the user, as detected and determined above. In step 670, crowd noise is played to the user. In step 672, the announcer from the away stadium is played to the user. Note that the processes of FIGS. 8A and 8B are repeated throughout the game. In some embodiments, a person watching a game could hear their different announcer for their team on their headset.

Figure 9:
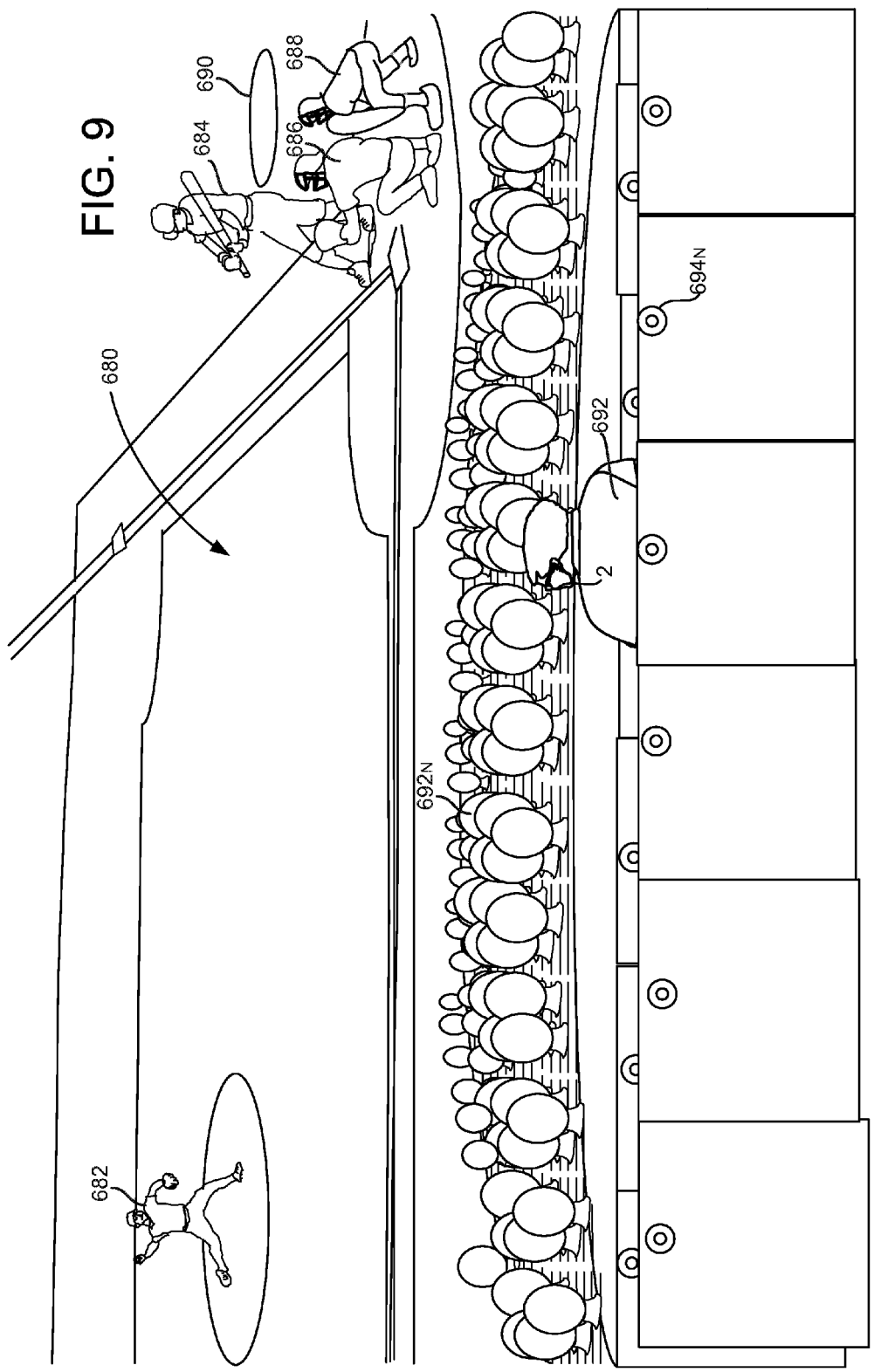
FIG. 9 illustrates an example of a display view projecting virtual event objects of baseball players onto a real baseball field from a user perspective of a seat at a baseball stadium.

FIG. 9 illustrates an example of a display view projecting virtual event objects of baseball players onto a real baseball field from a user perspective of a seat at a baseball stadium. A user Bob 692 is wearing a near-eye, augmented reality display device 2 and a companion processing module 4 and has a seat in a middle deck at the home stadium. The infield 680 is real and is really empty. The other spectators 692$_N$ are also real and have come to view the game remotely and have camaraderie with their fellow fans. Virtual data is projected by Bob's augmented reality display to show the action of a virtual object pitcher 682 as he throws the ball to the virtual batter 684 who is at home plate with a virtual object catcher 686 and a virtual umpire 688. The virtual objects for the baseball players and umpire are show the actions of real players at the away stadium in the case of a live event. If an animation of a past event, the virtual object actions mimic the actions that occurred in the past event. Again, the virtual objects may be realistic 3D avatars or be 3D image data of the real players in real time. The virtual data displayed to Bob by his personal A/V apparatus is based on his head position and orientation and optionally his gaze direction. For example, a point of gaze for Bob's may be determined based on his pupil positions to be the pitcher's mound. The virtual objects appearance is based on what Bob is looking at, not solely the view captured by a camera at the away stadium like when watching on TV. Sensor data on the players and ball and equipment track the motion of the objects and 3D models of the virtual objects are manipulated for the user perspective of Bob's personal A/V apparatus 8. The action of the real objects at the away stadium is recreated or regenerated for Bob's perspective.

Also shown in FIG. 9 are cameras 694$_N$ on the back of the seats. These may be web cams but are preferably 3D image capture devices 20 which capture image and depth data of a user in the seat behind the seat with the camera. Such cameras may be useful for sharing virtual data of spectators with others whom they choose as in the embodiment of FIG. 11.

Figure 10:
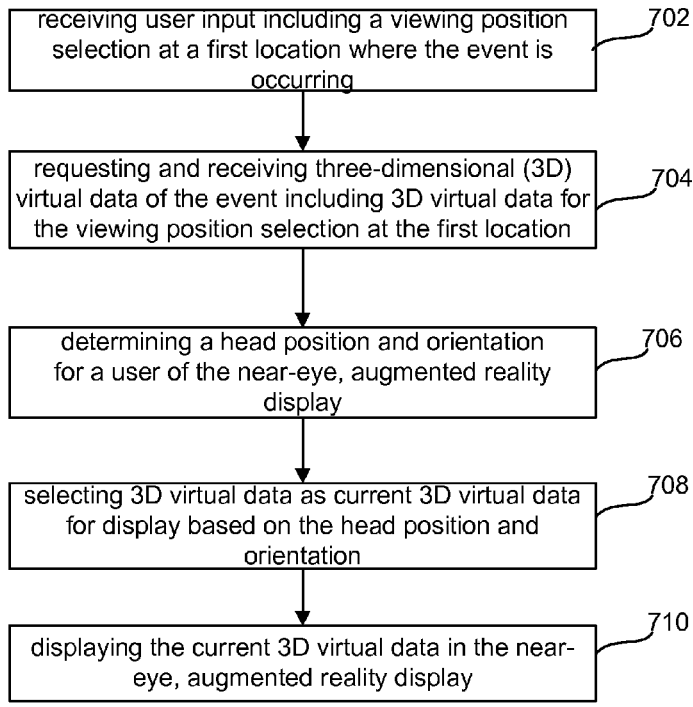
FIG. 10 is a flowchart of another embodiment of a method for providing a virtual spectator experience of an event including displaying 3D virtual data for a user selected viewing position by a near-eye, augmented reality display of a personal A/V apparatus.
Figure 11:
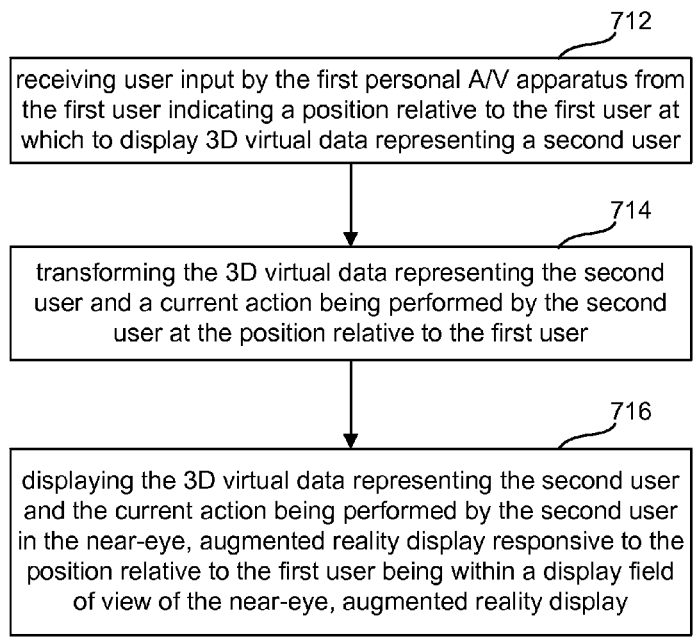
FIG. 11 is a flowchart of yet another embodiment of a method for providing a virtual spectator experience by displaying virtual data depicting a remote user by a near-eye, augmented reality display of a personal A/V apparatus.

FIGS. 10 and 11 describe other embodiments for providing a virtual spectator experience in which a personal A/V apparatus 8 may be operated by a user at a remote event space location from the event, at the event itself or at a remote location without an event space of similar geometry such as his or her living room.

FIG. 10 is a flowchart of another embodiment of a method for providing a virtual spectator experience of an event including displaying 3D virtual data for a user selected viewing position by a near-eye, augmented reality display of a personal A/V apparatus. In step 702, the personal A/V apparatus 8 receives user input including a viewing position selection at a first location where the event is occurring. The viewing position selection may be from a menu of viewing positions made available by the stadium or broadcasters which control the cameras 510, 512, 514, etc. at the location where the event is occurring or has occurred. An example of such a viewing position is the overhead view often seen on TV and captured from a blimp camera like those shown in FIGS. 7A and 7B. The overlay enhancement in dashed lines may be displayed as well to show the differences in the event spaces for the two locations. However, users likely desire to see the action close up. For example, a user desires to see a viewing position from home plate towards third base. The user may be seated in the upper deck at the actual game but wants to see the action up close. In step 704, the personal A/V apparatus requests and receives three-dimensional (3D) virtual data of the event including 3D virtual data for the viewing position selection at the first location, for example from a virtual event data provider system 404. In step 706, a head position and orientation and, optionally a gaze direction, is determined for a user of the near-eye, augmented reality display, and in step 708, the virtual spectator application 188 selects 3D virtual data as current 3D virtual data for display based on the head position and orientation, and optionally the gaze direction, and in step 710 causes the current 3D virtual data to be displayed in the near-eye, augmented reality display. The steps are repeated while the viewing position is still selected. When a user desires to see a view from home base looking down the third base line or see the fifty yard line in a football game, he or she wants to see the action as if being at that position not just a stationary view from a camera. For example, as the bases are loaded, and the player cracks the bat, the personal A/V apparatus 8 downloads data of the ball flying out into the outfield as the user likely wishes to look at the ball traveling in the air from her vantage point at home plate and then return to see if the runner at third makes it safe to home plate. The apparatus 8 is displaying virtual objects based on the head position and orientation data and optionally a gaze direction of the user as if the user were physically standing or sitting near home plate looking down the third baseline. The user's head and eye movements are the basis for what is displayed, rather than being locked into a fixed camera view.

In some embodiments, there may be a reference perspective associated with a viewing position which is used to correspond to a head position and head orientation approximating looking straight ahead. For example, a viewing position of the fifty yard line from one side of the field may use a camera perspective centered on the fifty yard line looking across the field as a reference perspective. The head position and orientation data from the user's personal A/V apparatus can be used to determine a direction difference of the user's line of sight compared with the reference perspective and this difference can be a starting position indicator for the 3D video from the viewing position. For example, if the head position indicates centered above the shoulders and the orientation indicates looking left, 3D video or just image data captured looking down the field to the left from a position of the fifty yard line is first displayed. As the user moves her head, the displayed images track with her position and orientation changes.

In some examples, a viewing position may be selected which is not associated with a position in the event space but with a movable object with an image capture device attached. Some examples of such viewing positions are a viewing position of a spectator of the event at the location where the event is occurring and a viewing position of a participating event object in the event like the football in a football stadium.

The 3D virtual data may be 3D video in some examples taken at the actual event. With such data, the personal A/V apparatus, the virtual event data provider system or both may interpolate data from different camera views to provide 3D video as the user moves her head or eyes.

FIG. 11 is a flowchart of yet another embodiment of a method for providing a virtual spectator experience by displaying virtual data depicting a remote user by a near-eye, augmented reality display of a personal A/V apparatus. For this embodiment, an image capture device and preferably one or more capture devices providing both image and depth data are available for capturing data of a user from which a virtual object can be generated. A user may have a predefined virtual object of him or her already stored in his or her user profile data 322 which may be accessed by the virtual spectator application. In step 712, user input is received by the first personal A/V apparatus 8 from a first user indicating a position relative to the first user at which to display 3D virtual data representing a second user. Some examples of a position relative to the first user is likely standing or sitting next to the first user. 3D virtual data can be generated of the second user based on captured image and preferably depth data as well. In step 714, the virtual spectator application 188 transforms the 3D virtual data representing the second user and a current action being performed by the second user to be at the position relative to the first user. For example, image data from one or more cameras $694_N$ may capture a front of a user cheering. In an example, the transforming step rotates a virtual object modeling the cheering based on a physics model for the object so the virtual object of the second user is seen through the display of the first user cheering from a side view. In another example, the virtual object is a 3D hologram of the second user including real time image data captured of the second user from multiple perspectives, and the transforming step rotates and perhaps scales the 3D hologram. In step 716, the 3D virtual data representing the second user and the current action being performed by the second user are displayed in the near-eye, augmented reality display responsive to the position relative to the first user being within a display field of view of the near-eye, augmented reality display of the first user.

Figure 12A:
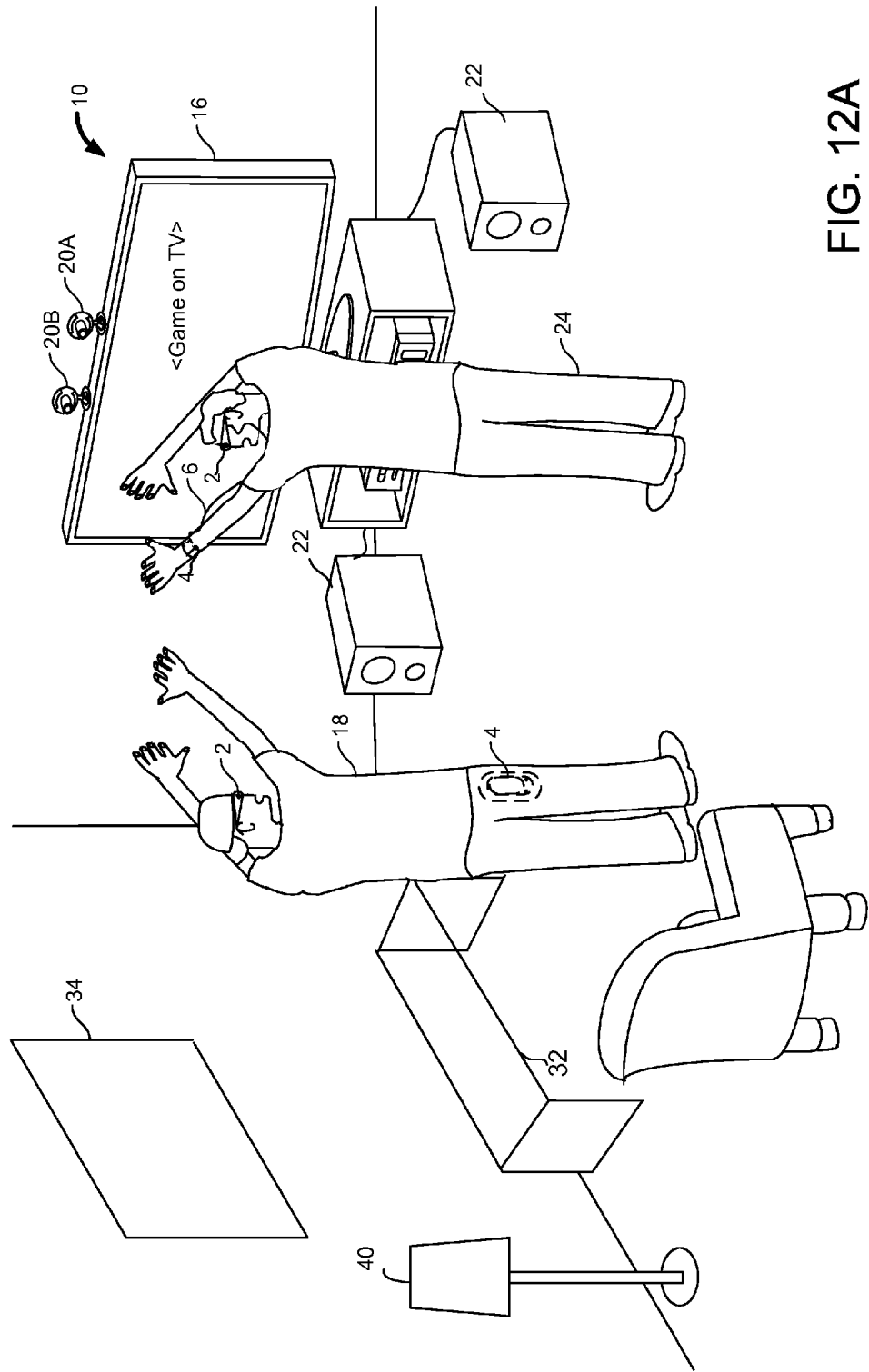
FIGS. 12A and 12B illustrate examples of different display views resulting from the embodiment of the method of FIG. 11 being performed for different users at remote locations.
Figure 12B:
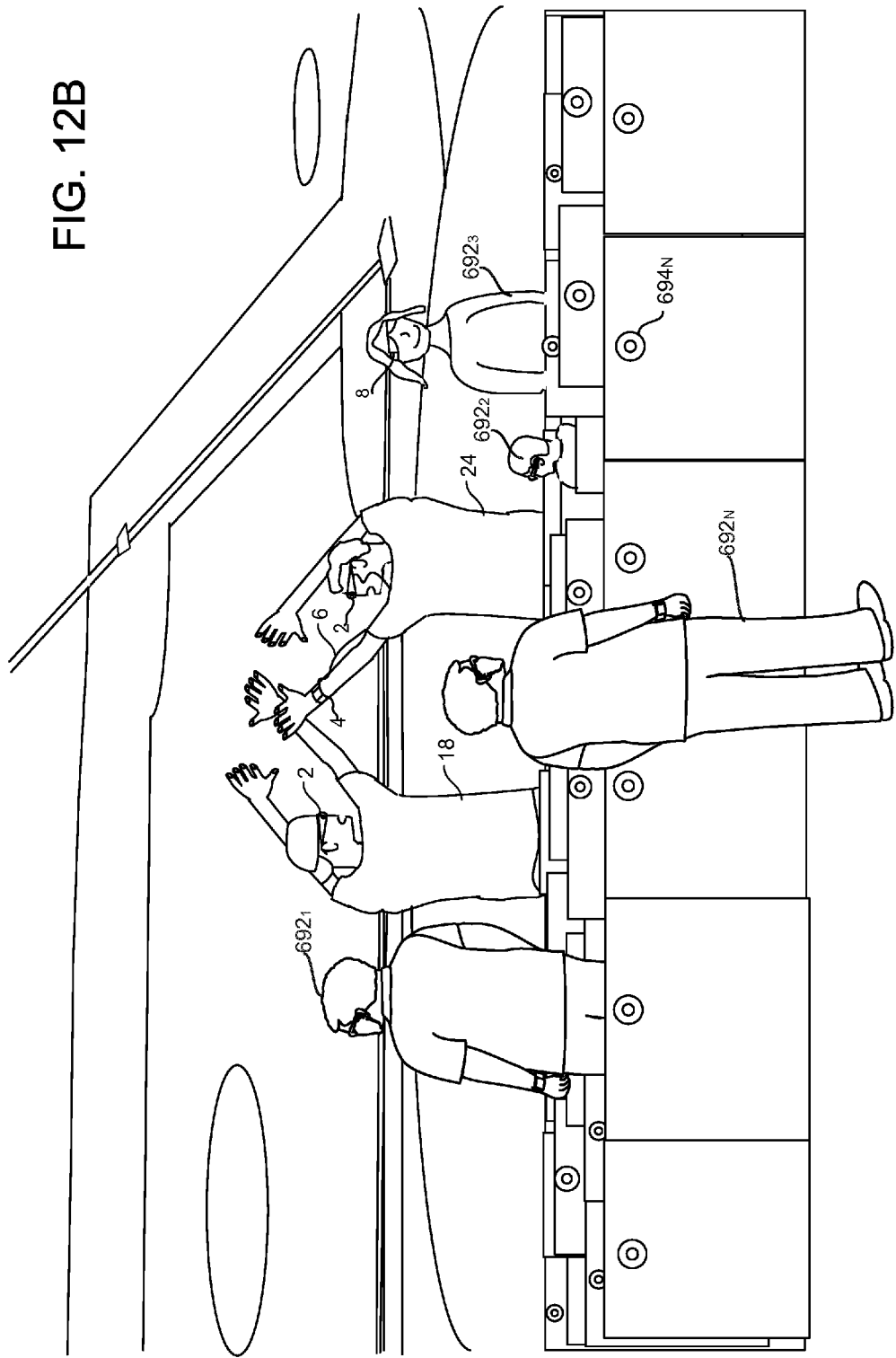

FIGS. 12A and 12B illustrate examples of different display views resulting from the embodiment of the method of FIG. 11 being performed for different users at remote locations. In FIG. 12A, Joe is in his living room watching the baseball game of FIG. 9 on his TV 16. By gaze or a pointing gesture captured by his own camera 113 on his augmented reality, display device 2 or by 3D image capture devices 20A and 20B mounted on the TV in his living, Joe indicates a side position relative to his head at which to view a virtual representation of his friend Greg 24 who is actually at the game. Greg who is also wearing a personal A/V apparatus 8 comprising a companion processing module 4, display device 2 and wire 6 also has entered user input indicating a side position to his left, a seat near him at which to see Joe 18. They are communicating audibly through their HMDs and the virtual event data provider systems 12 which are communicatively coupled over one or more networks 50. They decide to do the wave as part of the seventh inning stretch festivities at the game. The seventh inning stretch is a slightly longer period between offense and defense side changes when the players take a break from the field. In FIG. 12A, Greg's virtual object 24 is seen through Joe's display device 2 as he turns his head to the right side by the processing of the embodiment in FIG. 11. In FIG. 12B, the processing of FIG. 11 displays Joe 18 projected at a left side position relative to Greg 24 who is actually at the game when Greg's head orientation data from inertial sensors 132 indicate he is looking to his left.

Figure 13A:
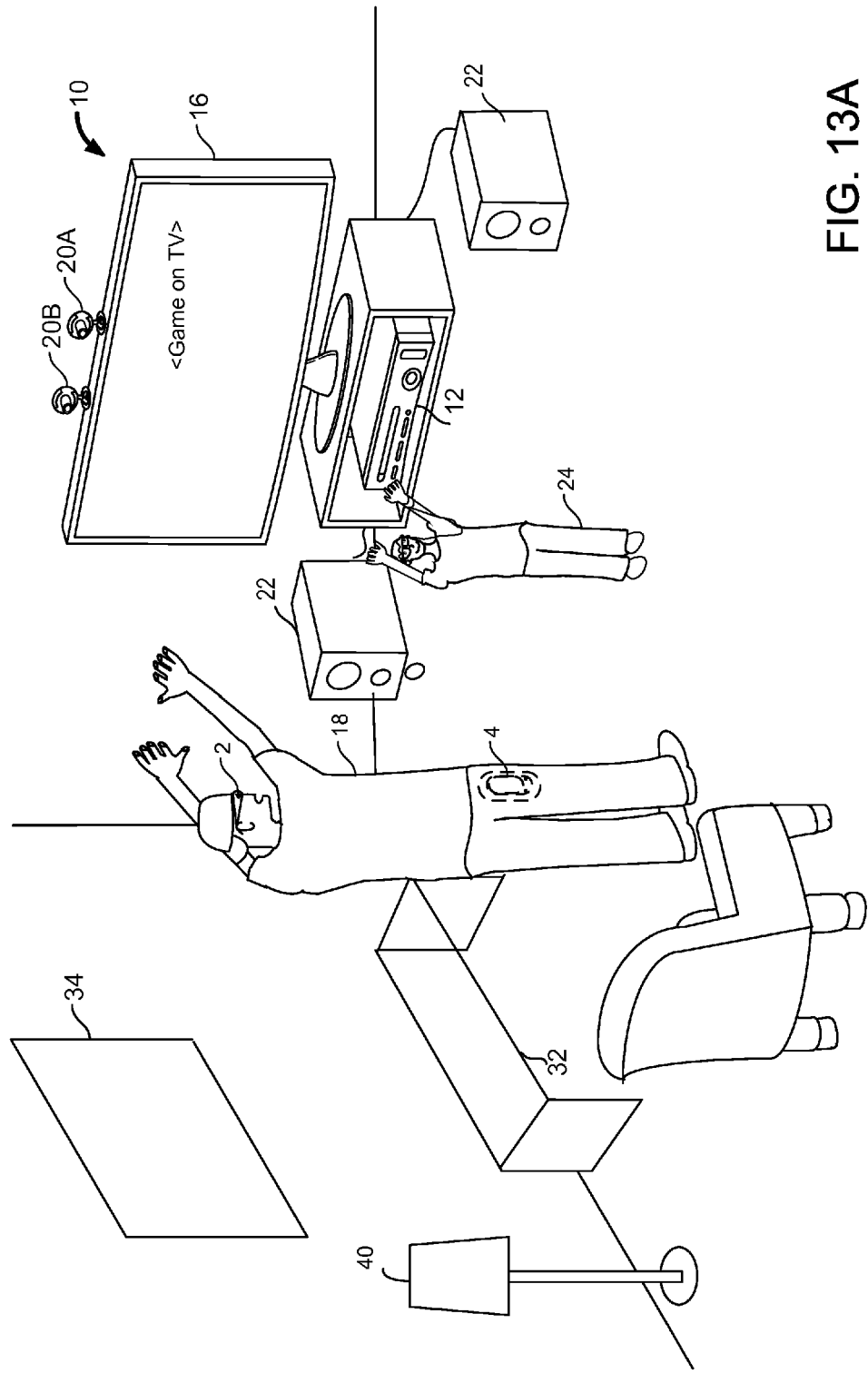

FIGS. 13A and 13B illustrate other examples of different display views resulting when the virtual spectator is displayed from the embodiment of the method of FIG. 11 being performed for different users at remote locations. The processing of the embodiment of FIG. 11 may be modified to eliminate the position transforming step. If Joe 18 is at home as in FIG. 13A, he sees an avatar of Greg 24 from the viewpoint of the capture device which captured image or image and depth data of Greg 24. Additionally, the avatar virtual object may be displayed at a predetermined default location relative to a user and the available space about him. In FIG. 13B, Joe 18 is at the game, and Greg is at home where capture devices 20A and 20B have captured and sent image and depth data of him doing "the wave" which is displayed to Joe 18.

FIG. 14 is a block diagram of one embodiment of a computing system that can be used to implement a network accessible computing system or a companion processing module. FIG. 14 is a block diagram of one embodiment of a computing system that can be used to implement one or more network accessible computing systems 12 or a processing unit 4 which may host at least some of the software components of computing environment 54 or other elements depicted in FIG. 3. With reference to FIG. 14, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 14 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 14 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

The above discussion describes many different ideas. Each of these ideas can be combined with the other above-described ideas such that a personal A/V apparatus and accompanying system can be designed to implement all of the ideas discussed above, or any subset of the ideas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a virtual spectator experience of an event for viewing with a near-eye, augmented reality display of a personal audiovisual (A/V) apparatus, comprising:
receiving in real time one or more positions of one or more event objects, including real objects, participating in the event occurring at a first location remote from a second location;
mapping the one or more positions of the one or more event objects in a first 3D coordinate system for the first location to a second 3D coordinate system for a second location remote from the first location;
determining a display field of view of a near-eye, augmented reality display of a personal A/V apparatus being worn at the second location and adjusting the one or more positions of a corresponding one of the one or more event objects based on a geometry at the second location; and
sending in real time 3D virtual data representing the one or more event objects which are within the display field of view to the personal A/V apparatus at the second location.

2. The method of claim 1 wherein the near-eye, augmented reality display is a near-eye, see-through, augmented reality display.

3. The method of claim 1 further comprising receiving in real time 3D virtual data of the one or more event objects which include the real objects over a communication network from one or more computer systems which generated the 3D virtual data based on image and depth data captured of the one or more real event objects.

4. The method of claim 1 wherein the event is an animation of a past event and the method further comprises:
receiving in real time 3D virtual data of the one or more event objects including virtual event objects for the animation over a communication network from one or more computer systems which generated the event objects.

5. The method of claim 1 wherein the second location and the first location are at least one of stadiums or theaters.

6. The method of claim 1 further comprising:
receiving a request for a selected viewing position of the event relative to the position at the first location at which to display the 3D virtual data at the second location;
transforming the 3D virtual data representing the second location and an action performed at the position relative to the first location; and
generating the 3D virtual data representing the second location and the action performed at the second location responsive to the position relative to the first location being within a display field of view of the near-eye, augmented reality display.

7. The method of claim 1 further comprising:
receiving a request for a selected viewing position of the event;
generating 3D video data of the first location from a perspective of the selected viewing position of the event occurring in real time at the first location.

8. An apparatus for providing a virtual spectator experience of an event for viewing with a near-eye, augmented reality display of a personal audiovisual (A/V) apparatus, comprising:
a first set of one or more processors having access to one or more memories storing a first three-dimensional (3D) coordinate system for a first location where an event is occurring in a first event space and storing a second (3D) coordinate system for a second location having a second event space, geometrically similar to the first event space, for hosting a same type of event as the event occurring at the first location;
the first set of one or more processors being communicatively coupled to a second set of one or more processors for receiving in real time 3D virtual data representing one or more event objects participating in the event at the first location and one or more positions of the one or more objects in the first 3D coordinate system for the first location;
the first set of one or more processors mapping the 3D virtual data representing one or more objects participating in the event at the first location to one or more positions in the second 3D coordinate system for the second location; and
the first set of one or more processors being communicatively coupled to the personal A/V apparatus including the near-eye, augmented reality display located at the second location, and the first set of one or more processors sending the 3D virtual data representing one or more event objects participating in the event with their respective one or more positions in the second 3D coordinate system for the second location to the personal A/V apparatus to provide the virtual data overlaid on the second event space to the near-eye, augmented reality display, the overlaid virtual data including enhancements based on profile information of a spectator at the second event space.

9. The apparatus of claim 8, wherein the near-eye, augmented reality display is a near-eye, see-through, augmented reality display.

10. The apparatus of claim 9 further comprising:
the 3D coordinate system for the first location and the 3D coordinate system for the second location are view independent coordinate systems;
the first set of one or more processors determining a display field of view for the near-eye, augmented reality display of the personal A/V apparatus in the second 3D coordinate system based on sensor data received from the personal A/V apparatus; and
the first set of one or more processors transforming the 3D virtual data representing the one or more event objects participating in the event from the view independent 3D coordinate system for second location to a view dependent coordinate system for the near-eye, augmented reality display of the personal A/V apparatus and sending the transformed 3D virtual data to the personal A/V apparatus.

11. The apparatus of claim 10 wherein the sensor data received from the personal A/V apparatus includes image and depth data from at least one capture device positioned on the personal A/V apparatus.

12. The apparatus of claim 10 further comprising:
the first set of one or more processors generating and storing in the one or more memories virtual overlay data representing boundary data indicating boundaries of the 3D coordinate system for the first location with respect to boundaries for the 3D coordinate system for the second location; and
responsive to a request from the personal A/V apparatus requesting display of the virtual overlay data when the boundary data is in the field of view of the near-eye, augmented reality display, including the virtual overlay data in the transformed 3D virtual data responsive to boundary data being in the field of view of the display.

13. The apparatus of claim 8 further comprising:
a plurality of capture devices positioned throughout the first location to capture the data of the objects in the event from multiple perspectives at the first location;
the second set of one or more processors having a second set of one or more memories and being communicatively coupled to the plurality of capture devices for receiving image data and depth data of the one or more objects in the event at the first location; and
the second set of one or more processors generating the 3D virtual data representing the one or more objects participating in the event based on the received image and depth data of the one or more objects.

14. The apparatus of claim 8 further comprising:
the second set of one or more processors further being in communication with position sensors of the one or more event objects at the first location for mapping the one or more positions of the one or more event objects in the 3D coordinate system for the first location.

15. The apparatus of claim 8 further comprising:
the first set of one or more processors identifying a set of viewing positions for at least one of the locations for which 3D video of its respective view of the event is available; and
responsive to receiving a request from the personal A/V apparatus for 3D video for a selected viewing position from the set, the first set of one or more processors sending the requested 3D video for the selected viewing position to the personal A/V apparatus.

16. The apparatus of claim 15 further comprising:
the first set of one or more processors receiving 3D video data for different viewing positions of the event at the first location;
the first set of one or more processors determining a starting position indicator in the 3D video data for the selected viewing position for display by the near-eye, augmented reality display based on a head position and orientation for the indicated in inertial data in the sensor data received from the personal A/V apparatus and a gaze direction for the user indicated in gaze data received from the personal A/V apparatus;
the first set of one or more processors selecting 3D video data for the selected viewing position from the received 3D video data based on the starting position indicator and sending the selected 3D video data to the personal A/V apparatus;
the first set of one or more processors continuously tracking the head position and orientation as indicated in the sensor data continuously received from the personal A/V apparatus, updating the selected 3D video data in accordance with any tracked head position and orientation changes based on the starting position indicator for the selected viewing position, and sending updates of the selected 3D video data to the personal A/V apparatus.

17. The apparatus of claim 15 wherein the set of viewing positions includes at least one of the following:
a viewing position of a spectator of the event at the first location; or
a viewing position of a participating object in the event at the first location.

18. One or more processor readable storage devices comprising instructions which cause one or more processors to execute a method for providing a virtual spectator experience of an event using a near-eye, augmented reality display of a first personal A/V apparatus, the method comprising:
receiving user input selecting a viewing position at a first location where the event is occurring; and
requesting and receiving three-dimensional (3D) virtual data of the event including 3D virtual data for the viewing position at the first location over a communication network from one or more computer systems which generate the 3D virtual data of the event for the viewing position based on received image data and depth data from capture devices at the first location;
determining a head position and orientation of a first user wearing the near-eye, augmented reality display;
selecting 3D virtual data as current 3D virtual data for display in the near-eye, augmented reality display based on the head position and orientation; and
displaying the current 3D virtual data in the near-eye, augmented reality display with enhanced 3D virtual data, the enhanced 3D virtual data providing a first user customizable experience including customized advertisements.

19. The one or more processor readable storage devices of claim 16 wherein the method further comprises:
receiving user input by the first personal A/V apparatus from the first user indicating a position relative to the first user at which to display 3D virtual data representing a second user;
transforming the 3D virtual data representing the second user and a current action being performed by the second user at the position relative to the first user; and
displaying the 3D virtual data representing the second user and the current action being performed by the second user in the near-eye, augmented reality display responsive to the position relative to the first user being within a field of view of the near-eye, augmented reality display.

20. The one or more processor readable storage devices of claim 18 wherein the first location is at least one of the following:
the location at which the event is occurring; or
location remote from the event.

* * * * *